US012343305B2

(12) United States Patent
Suarez et al.

(10) Patent No.: US 12,343,305 B2
(45) Date of Patent: Jul. 1, 2025

(54) HEALTH MANAGEMENT SYSTEM

(71) Applicant: Welch Allyn, Inc., Skaneateles Falls, NY (US)

(72) Inventors: Carlos Suarez, Syracuse, NY (US); David Kellner, Auburn, NY (US); John Lane, Weesport, NY (US); Aaron R. Burnham, Auburn, NY (US); Edward Bremer, Penfield, NY (US); Tyler Nigolian, Syracuse, NY (US); Raymond Lia, Auburn, NY (US); Robert L. Vivenzio, Auburn, NY (US); Thaddeus J. Wawro, Auburn, NY (US); Rachel K. Douglas, Latrobe, PA (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 1020 days.

(21) Appl. No.: 17/341,742

(22) Filed: Jun. 8, 2021

(65) Prior Publication Data

US 2022/0047446 A1 Feb. 17, 2022

Related U.S. Application Data

(60) Provisional application No. 63/064,486, filed on Aug. 12, 2020.

(51) Int. Cl.
*A61H 9/00* (2006.01)

(52) U.S. Cl.
CPC ......... *A61H 9/0078* (2013.01); *A61H 9/0071* (2013.01); *A61H 2201/0103* (2013.01);
(Continued)

(58) Field of Classification Search
CPC ................ A61H 9/0078; A61H 9/0071; A61H 2201/0103; A61H 2201/1215;
(Continued)

(56) References Cited

U.S. PATENT DOCUMENTS

| | | | | |
|---|---|---|---|---|
| 3,454,010 A | | 7/1969 | Lilligren et al. | |
| 3,786,802 A | * | 1/1974 | Hagopian ........... | A61H 9/0078 601/152 |

(Continued)

FOREIGN PATENT DOCUMENTS

| | | |
|---|---|---|
| CN | 101879117 B | 7/2012 |
| CN | 108542734 A | 9/2018 |

(Continued)

OTHER PUBLICATIONS

Machine translation of written description and claims for WO2014010135A1 to Fumitaka via espacenet. (Year: 2014).*

*Primary Examiner* — Timothy A Stanis
*Assistant Examiner* — Tyler A Raubenstraw
(74) *Attorney, Agent, or Firm* — Price Heneveld LLP

(57) ABSTRACT

A therapeutic wrap includes a flexible member configured to wrap around an affected area. Actuators are operably coupled to the flexible member. Each actuator is operable between a deployed state and a non-deployed state. A first coupling feature is disposed proximate a first edge on a first surface of the flexible member. A second coupling feature is disposed proximate a second edge on a second surface of the flexible member. The first coupling feature is configured to engage the second coupling feature when the flexible member is wrapped around the affected area and when the flexible member is slidably adjusted relative to the affected area. A retaining feature is coupled to at least one end of the flexible member and configured to retain the flexible member in a selected position on the affected area.

13 Claims, 18 Drawing Sheets

(52) U.S. Cl.
CPC ................ *A61H 2201/1215* (2013.01); *A61H 2201/1635* (2013.01); *A61H 2201/164* (2013.01); *A61H 2201/165* (2013.01); *A61H 2201/5097* (2013.01); *A61H 2205/06* (2013.01); *A61H 2205/106* (2013.01); *A61H 2209/00* (2013.01); *A61H 2230/04* (2013.01)

(58) Field of Classification Search
CPC ...... A61H 2201/1635; A61H 2201/164; A61H 2201/165; A61H 2201/5097; A61H 2205/06; A61H 2205/106; A61H 2209/00; A61H 2230/04; A61H 9/00; A61H 9/005; A61H 15/00
See application file for complete search history.

(56) References Cited

U.S. PATENT DOCUMENTS

| | | | | | |
|---|---|---|---|---|---|
| 3,859,989 | A | * | 1/1975 | Spielberg | A61H 9/005 601/11 |
| 5,976,099 | A | | 11/1999 | Kellogg | |
| 6,010,471 | A | | 1/2000 | Ben-Noon | |
| 6,179,796 | B1 | | 1/2001 | Waldridge | |
| 7,063,676 | B2 | | 6/2006 | Barak et al. | |
| 7,135,007 | B2 | | 11/2006 | Scott et al. | |
| 7,354,410 | B2 | | 4/2008 | Perry et al. | |
| 7,549,966 | B2 | * | 6/2009 | Fujii | A61H 15/0078 601/149 |
| 8,079,969 | B2 | | 12/2011 | Rousso et al. | |
| 8,523,794 | B2 | | 9/2013 | Iker et al. | |
| 8,652,059 | B2 | | 2/2014 | Sano et al. | |
| 8,764,689 | B2 | | 7/2014 | Toth | |
| 8,827,936 | B1 | | 9/2014 | Adaie | |
| 9,211,071 | B2 | | 12/2015 | Sano et al. | |
| 9,211,226 | B1 | * | 12/2015 | Menzel | A61H 9/005 |
| 9,248,330 | B1 | * | 2/2016 | Ghanem | A63B 21/068 |
| 9,549,867 | B1 | * | 1/2017 | El-Messeiry | A61H 7/001 |
| 10,016,326 | B2 | * | 7/2018 | Purdy | A61G 13/125 |
| 10,076,462 | B2 | | 9/2018 | Johnson et al. | |
| 10,172,757 | B2 | | 1/2019 | Kazanchyan et al. | |
| 10,362,968 | B2 | | 7/2019 | Zhu et al. | |
| 10,492,974 | B2 | | 12/2019 | Chase et al. | |
| 11,083,664 | B2 | * | 8/2021 | Vain | A61F 5/0106 |
| 2002/0022791 | A1 | | 2/2002 | Morris et al. | |
| 2003/0045817 | A1 | * | 3/2003 | Suh | A61H 15/0078 601/102 |
| 2003/0050578 | A1 | * | 3/2003 | Suh | A61H 9/0078 601/102 |
| 2005/0159690 | A1 | * | 7/2005 | Barak | A61H 9/0078 601/149 |
| 2006/0287621 | A1 | | 12/2006 | Atkinson et al. | |
| 2007/0088239 | A1 | * | 4/2007 | Roth | A61H 9/0078 601/152 |
| 2008/0091129 | A1 | * | 4/2008 | Chen | A61H 15/0078 601/99 |
| 2008/0097230 | A1 | | 4/2008 | Marks et al. | |
| 2008/0195018 | A1 | | 8/2008 | Larson et al. | |
| 2011/0009757 | A1 | | 1/2011 | Sano et al. | |
| 2011/0054366 | A1 | | 3/2011 | Smith et al. | |
| 2011/0082401 | A1 | * | 4/2011 | Iker | A61H 9/0092 601/152 |
| 2012/0065561 | A1 | * | 3/2012 | Ballas | A61H 9/0092 601/152 |
| 2014/0052028 | A1 | * | 2/2014 | Wright | A61H 1/006 600/592 |
| 2014/0142478 | A1 | * | 5/2014 | Malaviya | A61H 15/0078 601/115 |
| 2014/0276289 | A1 | | 9/2014 | Mansur, Jr. et al. | |
| 2014/0276294 | A1 | | 9/2014 | Mansur, Jr. et al. | |
| 2014/0277102 | A1 | | 9/2014 | Mansur, Jr. et al. | |
| 2014/0303533 | A1 | * | 10/2014 | Zeutzius | A61H 9/0092 601/151 |
| 2014/0316314 | A1 | * | 10/2014 | Schubert | A61H 9/0092 601/149 |
| 2015/0105707 | A1 | * | 4/2015 | Purdy | A61H 9/005 601/151 |
| 2015/0202115 | A1 | * | 7/2015 | Aronson | A61H 9/0078 601/11 |
| 2015/0297442 | A1 | | 10/2015 | Bauer | |
| 2016/0213555 | A1 | * | 7/2016 | Johnston | A61H 7/003 |
| 2016/0242984 | A1 | | 8/2016 | Takagi et al. | |
| 2016/0262971 | A1 | * | 9/2016 | Doron | A61B 5/1073 |
| 2017/0087001 | A1 | | 3/2017 | Fullerton | |
| 2017/0181921 | A1 | * | 6/2017 | Wren | A61H 11/00 |
| 2017/0258673 | A1 | * | 9/2017 | Inada | A61H 9/0078 |
| 2017/0312165 | A1 | * | 11/2017 | Johnson | A61B 5/021 |
| 2018/0092797 | A1 | | 4/2018 | Uzzo et al. | |
| 2018/0098707 | A1 | | 4/2018 | Salamon et al. | |
| 2018/0177677 | A1 | | 6/2018 | Pamplin et al. | |
| 2018/0303698 | A1 | | 10/2018 | Wijesundara et al. | |
| 2018/0338692 | A1 | | 11/2018 | Robinson et al. | |
| 2019/0151190 | A1 | * | 5/2019 | Burbank | A61H 15/0078 |
| 2019/0290479 | A1 | * | 9/2019 | Parish | A61F 7/0085 |
| 2019/0374424 | A1 | | 12/2019 | Zeutzius et al. | |
| 2020/0016019 | A1 | * | 1/2020 | Farha | A61H 23/0254 |
| 2020/0022867 | A1 | * | 1/2020 | Inada | A61H 1/00 |
| 2020/0113773 | A1 | * | 4/2020 | Ramanan | A61H 9/0078 |
| 2020/0205707 | A1 | | 7/2020 | Sanyal et al. | |
| 2020/0253812 | A1 | * | 8/2020 | Noskowicz | A61H 9/0092 |
| 2020/0306129 | A1 | * | 10/2020 | Franklin | A47C 21/00 |
| 2020/0316365 | A1 | * | 10/2020 | Hyde | A63B 22/0076 |
| 2021/0007927 | A1 | * | 1/2021 | Le | A61H 9/0078 |
| 2021/0015698 | A1 | * | 1/2021 | Spyropoulos | A61H 9/0092 |
| 2021/0022565 | A1 | * | 1/2021 | Yoo | A61H 35/006 |
| 2021/0030617 | A1 | * | 2/2021 | Penn | A61H 39/04 |
| 2021/0069050 | A1 | * | 3/2021 | Welsh | A61H 9/0078 |
| 2021/0155136 | A1 | * | 5/2021 | Kim | B60N 2/976 |
| 2021/0290477 | A1 | * | 9/2021 | Gonon | A61H 9/0092 |
| 2021/0290478 | A1 | * | 9/2021 | Ravikumar | A61H 9/0092 |
| 2021/0315753 | A1 | * | 10/2021 | Trask | A61G 5/12 |
| 2021/0330265 | A1 | * | 10/2021 | Franz | A61H 23/02 |
| 2021/0353496 | A1 | * | 11/2021 | Ahn | A61H 11/00 |
| 2021/0361514 | A1 | * | 11/2021 | Choi | A61H 1/0237 |
| 2022/0183900 | A1 | * | 6/2022 | Ben-Yaacov | A61H 1/00 |

FOREIGN PATENT DOCUMENTS

| | | | | | |
|---|---|---|---|---|---|
| CN | 106166104 | B | | 12/2018 | |
| CN | 209059559 | U | | 7/2019 | |
| EP | 1884226 | A1 | | 2/2008 | |
| EP | 1972312 | A2 | | 9/2008 | |
| EP | 3412262 | A1 | | 12/2018 | |
| EP | 3574885 | A1 | * | 12/2019 | |
| JP | 1094574 | A | | 4/1998 | |
| WO | 0219954 | A2 | | 3/2002 | |
| WO | 2006033114 | A2 | | 3/2006 | |
| WO | 2007079777 | A1 | | 7/2007 | |
| WO | 2012009669 | A1 | | 1/2012 | |
| WO | WO-2014010135 | A1 | * | 1/2014 | A61H 7/004 |
| WO | 2015148223 | A1 | | 10/2015 | |
| WO | 2017117305 | A1 | | 7/2017 | |
| WO | 2017121434 | A1 | | 7/2017 | |
| WO | 2018152159 | A1 | | 8/2018 | |
| WO | WO-2019064288 | A1 | * | 4/2019 | A61G 10/02 |
| WO | 2019084448 | A1 | | 5/2019 | |
| WO | 2019182189 | A1 | | 9/2019 | |

* cited by examiner

HEALTH MANAGEMENT SYSTEM

CROSS-REFERENCE TO RELATED APPLICATION

This application claims priority to and the benefit under 35 U.S.C. § 119(e) of U.S. Provisional Application No. 63/064,486, filed on Aug. 12, 2020, entitled "HEALTH MANAGEMENT SYSTEM," the disclosure of which is hereby incorporated herein by reference in its entirety.

FIELD OF THE DISCLOSURE

The present disclosure generally relates to a health management system, and more particularly, a health management system for treating various conditions, including lymphedema and deep vein thrombosis.

SUMMARY OF THE DISCLOSURE

According to one aspect of the present disclosure, a wrap for covering an affected area includes a flexible member configured to wrap around the affected area. Actuators are operably coupled to the flexible member. Each actuator is operable between a deployed state and a non-deployed state. A first coupling feature is disposed proximate a first edge on a first surface of the flexible member. A second coupling feature is disposed proximate a second edge on a second surface of the flexible member. The first coupling feature is configured to engage the second coupling feature when the flexible member is wrapped around the affected area and when the flexible member is slidably adjusted relative to the affected area. A retaining feature is coupled to at least one end of the flexible member and is configured to retain the flexible member in a selected position on the affected area.

According to another aspect of the present disclosure, a garment includes a flexible member configured to be worn on an affected area. A power source is operably coupled to the flexible member. An electromagnetic actuator is operably coupled to the power source. The electromagnetic actuator is operable between a deployed state and a non-deployed state in response to a voltage from the power source. The electromagnetic actuator applies pressure to the affected area when in the deployed state.

According to another aspect of the present disclosure, a health management system includes a therapeutic pad for supporting an affected area of a patient. Actuators are operably coupled to the therapeutic pad. A controller is communicatively coupled to the actuators. The controller is configured to adjust the actuators between a deployed state and a non-deployed state. The actuators are configured to apply pressure to the affected area supported by the therapeutic pad when the actuators are in the deployed state.

These and other features, advantages, and objects of the present disclosure will be further understood and appreciated by those skilled in the art by reference to the following specification, claims, and appended drawings.

DETAILED DESCRIPTION

Figure 1:
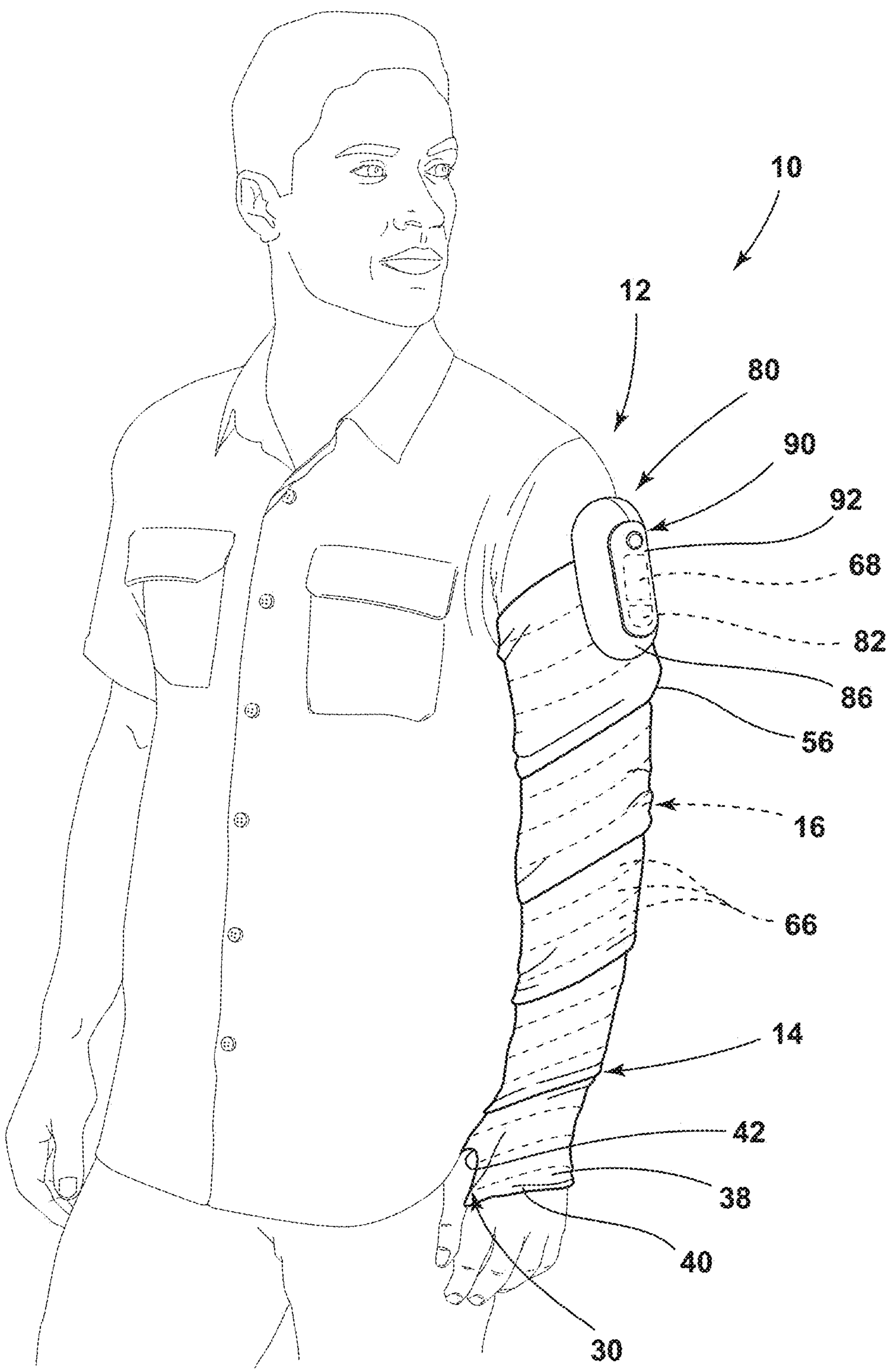
FIG. 1 is a side perspective view of a therapeutic wrap worn on an arm of a patient, according to the present disclosure.

The present illustrated embodiments reside primarily in combinations of method steps and apparatus components related to a health management system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-25, reference numeral 10 generally designates a health management system 10 that includes a treatment assembly 12 that has a flexible member 14 configured to wrap around an affected area. Actuators 16 are operably coupled to the flexible member 14. Each actuator 16 is operable between a deployed state and a non-deployed state. A first coupling feature 18 is disposed proximate a first edge 20 on a first surface 22 of the flexible member 14. A second coupling feature 24 is disposed proximate a second edge 26 on a second surface 28 of the flexible member 14. The first coupling feature 18 is configured to engage the second coupling feature 24 when the flexible member 14 is wrapped around the affected area and when the flexible member 14 is slidably moved relative to the affected area. A retaining feature 30 is coupled to at least one end of the flexible member 14 and configured to retain the flexible member 14 in a selected position on the affected area.

The health management system 10 may be used to manage certain health conditions, such as lymphedema, deep vein thrombosis (DVT), skin ulcers, and other similar conditions. Lymphedema is a chronic disease that may result from a variety of factors, including diabetes, radiation, chemotherapy, and surgery. Lymphedema generally causes the body to fill with lymphatic fluid, which results in swelling. The swelling may cause pain and discomfort, as well as cause lesions and hardening of the skin. One method to help manage lymphedema includes massage therapy. Massage therapy may assist in moving lymphatic fluid to the lymphatic system, and subsequently to the circulatory system. DVT is a condition where blood clots form in parts of the body. DVT often affects people who are sedentary or aged. Massage therapy may assist in increasing blood flow in affected areas to manage DVT. Skin ulcers may be caused by prolonged periods of poor blood flow to the affected area of the body. Poor blood flow may occur as a result of an infection, immobility, or health conditions, such as diabetes. Massage therapy may be utilized to increase local blood flow, which may prevent the development of skin ulcers.

Massage therapy treatments may be provided by the health management system 10 disclosed herein. The person receiving the treatment is generally referred to herein as a patient. The treatment provided by the health management system 10 may be more convenient for the patient as the mobility of the health management system 10 allows for treatment to be provided in the home or otherwise outside of a traditional medical setting.

Referring to FIG. 1, the treatment assembly 12 includes the flexible member 14, which is configured as a wrap or a therapeutic wrap 38. The therapeutic wrap 38 is configured to be spiraled or wound around an extent of the affected area, which is illustrated as an arm of the patient. It is contemplated that the therapeutic wrap 38 may be a spiral wrap, as illustrated, or alternatively may be any type of therapeutic device that surrounds or covers the affected area to provide treatment, such as, for example, a sleeve, a sock, another garment, another type of covering, etc. The therapeutic wrap 38 configured as a spiral wrap is elongated to form a helix shape along the arm from proximate the shoulder to proximate the wrist. The flexible member 14 is generally constructed of fabric or similar material to abut the affected area when wound in the helix shape.

Figure 2:
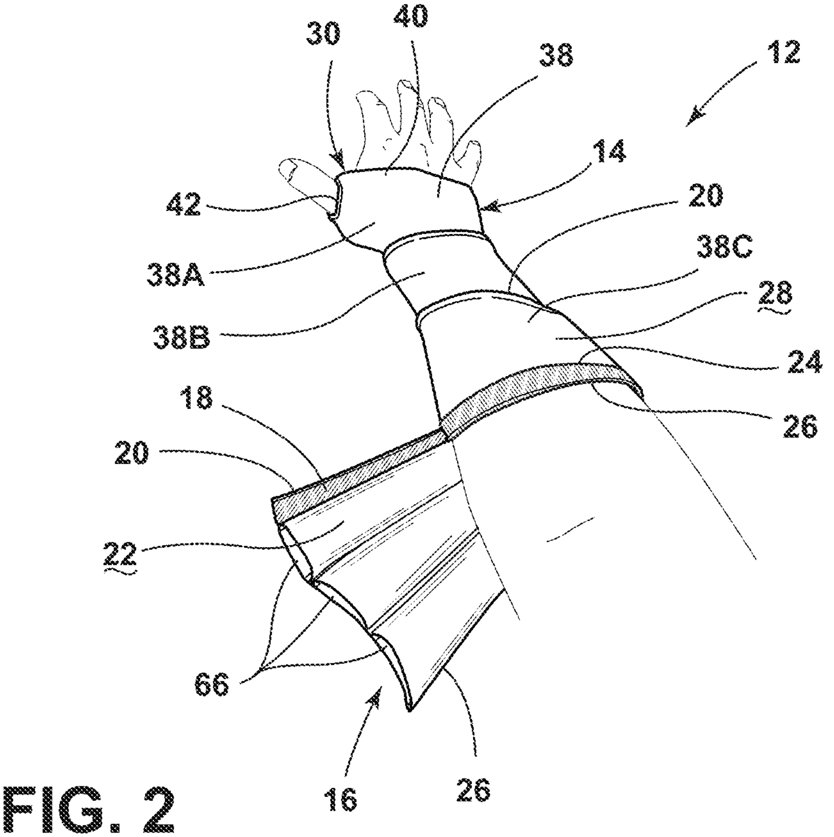
FIG. 2 is a partial top perspective view of the therapeutic wrap of FIG. 1 partially applied to the arm of the patient, according to the present disclosure.

Referring to FIGS. 1 and 2, the therapeutic wrap 38 includes the first surface 22 and the second surface 28. When the therapeutic wrap 38 is applied to the affected area, the first surface 22 abuts the skin of the patient (e.g., an inner surface), and the second surface 28 is oriented away from the skin (e.g., an outer surface). With each new spiral, illustrated as spirals 38A-38C, of the therapeutic wrap 38, the therapeutic wrap 38 at least partially overlaps a previous spiral to cover the affected area with no gaps between adjacent spirals. Generally, the therapeutic wrap 38 is first applied to the hand or wrist and then spiraled up the arm toward the shoulder.

To maintain the helix shape of the therapeutic wrap 38, the therapeutic wrap 38 includes the first coupling feature 18 that is configured to engage the second coupling feature 24. The first coupling feature 18 extends along the first edge 20 on the first surface 22 of the therapeutic wrap 38. The second coupling feature 24 extends along the second edge 26 on the second surface 28 of the therapeutic wrap 38. Accordingly, when the first edge 20 overlaps the second edge 26 during adjacent spirals around the affected area, the first coupling feature 18 is disposed over and engages the second coupling feature 24 of the previous spiral. Each of the first coupling feature 18 and the second coupling feature 24 may be Velcro®, hook-and-loop fasteners, snap features, or any other similar fastening features configured to engage with one another.

As the therapeutic wrap 38 is wound around the affected area, the second coupling feature 24 is exposed (e.g., facing outward from the affected area) and the first coupling feature 18 is configured to engage the second coupling feature 24 in each subsequent spiral. For example, in the spiral 38A the second coupling feature 24 is exposed and as the therapeutic wrap 38 winds into the spiral 38B, the first coupling feature 18 on the spiral 38B engages the second coupling feature 24 on the spiral 38A. The first coupling feature 18 and the second coupling feature 24 may engage one another between adjacent spirals (e.g., between spirals 38A, 38B, between spirals 38B, 38C, etc.) from proximate the wrist to proximate the shoulder. It is generally contemplated that each of the first coupling feature 18 and the second coupling feature 24 extend along the entire longitudinal extent of the therapeutic wrap 38 to provide a customizable fit of the therapeutic wrap 38 around the arm.

Referring still to FIGS. 1 and 2, the helix shape of the therapeutic wrap 38 may be maintained by the engagement between the first coupling feature 18 and the second coupling feature 24 as the patient slidably moves the therapeutic wrap 38 relative to the affected area. The patient may initially wrap the therapeutic wrap 38 around the arm for treatment, as described above. To remove the therapeutic wrap 38, the patient may pull the therapeutic wrap 38 and slide the therapeutic wrap 38 from the affected area without unwinding the therapeutic wrap 38. To again apply treatment to the affected area, the patient may insert the arm through the therapeutic wrap 38, which remains in its original helix shape, and pull the therapeutic wrap 38 onto the affected area without having to rewind the therapeutic wrap 38 around the arm. The patient may slide the preformed therapeutic wrap 38 over the affected area.

The first coupling feature 18 and the second coupling feature 24 are configured to remain engaged with one another as the therapeutic wrap 38 is slidably moved relative to the affected area (e.g., removed from or applied to the affected area). The therapeutic wrap 38 remaining in the helix shape may be advantageous for a more convenient application of the therapeutic wrap 38 to provide treatment. The patient may not go through the cumbersome process of winding and unwinding the therapeutic wrap 38 for each treatment.

The therapeutic wrap 38 is adjustable by disengaging the second coupling feature 24 from the first coupling feature 18 and unwinding the therapeutic wrap 38. Unwinding and rewinding the therapeutic wrap 38 over the affected area may adjust the custom shape and size of the helix shape around the arm. Depending on the patient or the amount of excess fluid in the arm, the therapeutic wrap 38 may be customized and adjusted to form fit around the arm of the patient.

Referring still to FIGS. 1 and 2, a distal end 40 of the therapeutic wrap 38 disposed proximate the wrist includes the retaining feature 30. The retaining feature 30 is configured as an aperture 42 defined in the distal end 40 of the therapeutic wrap 38, which receives a finger, such as a thumb, of the patient. The patient may slide the thumb through the aperture 42, wrap the therapeutic wrap 38 over the hand in the spiral 38A and around the wrist in the spiral 38B, and then continue to wind the therapeutic wrap 38 around the arm in the spiral 38C toward the shoulder. Alternatively, the patient may slide the thumb through the aperture 42 and then slide the therapeutic wrap 38 over the affected area. The retaining feature 30 is advantageous for retaining the therapeutic wrap 38 in a selected position on the affected area. For example, the thumb extending through the aperture 42 may prevent the therapeutic wrap 38 from sliding up the arm during treatment.

The aperture 42 for the thumb may also be advantageous for more conveniently removing the therapeutic wrap 38 from the arm. The patient may grasp the therapeutic wrap 38 adjacent to the aperture 42 and pull to slide the therapeutic wrap 38 from the affected area. The therapeutic wrap 38 may slide from the affected area more easily with the aperture 42 than without the aperture 42.

Figure 3:
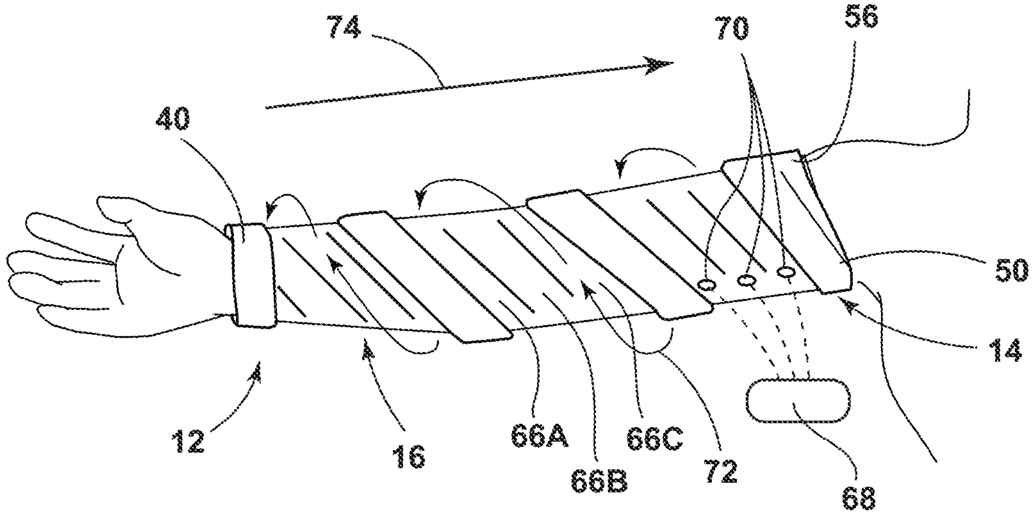
FIG. 3 is a schematic view of a therapeutic wrap worn on an arm of a patient, according to the present disclosure.
Figure 4:
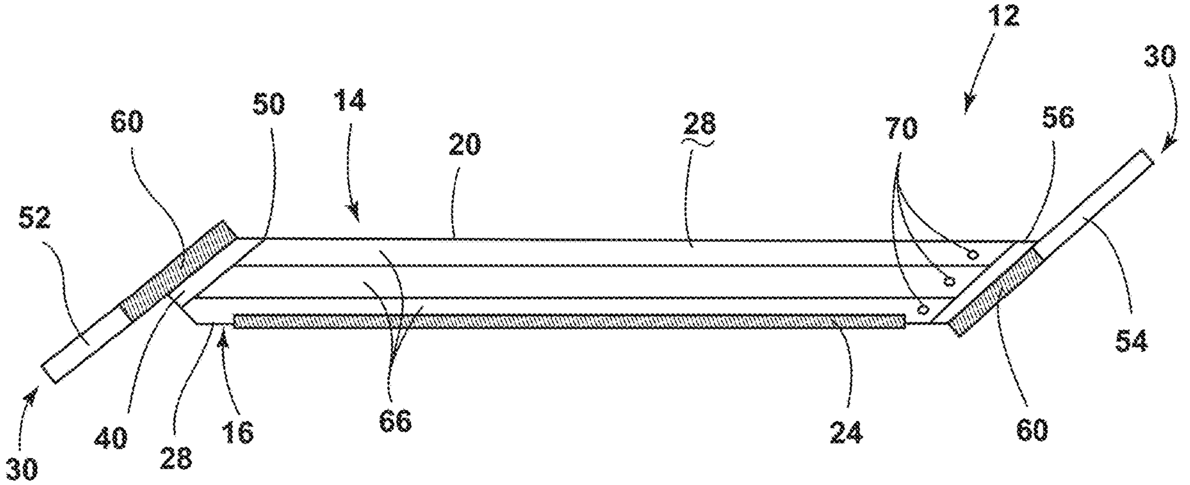
FIG. 4 is a top plan view of a therapeutic wrap, according to the present disclosure.
Figure 5:
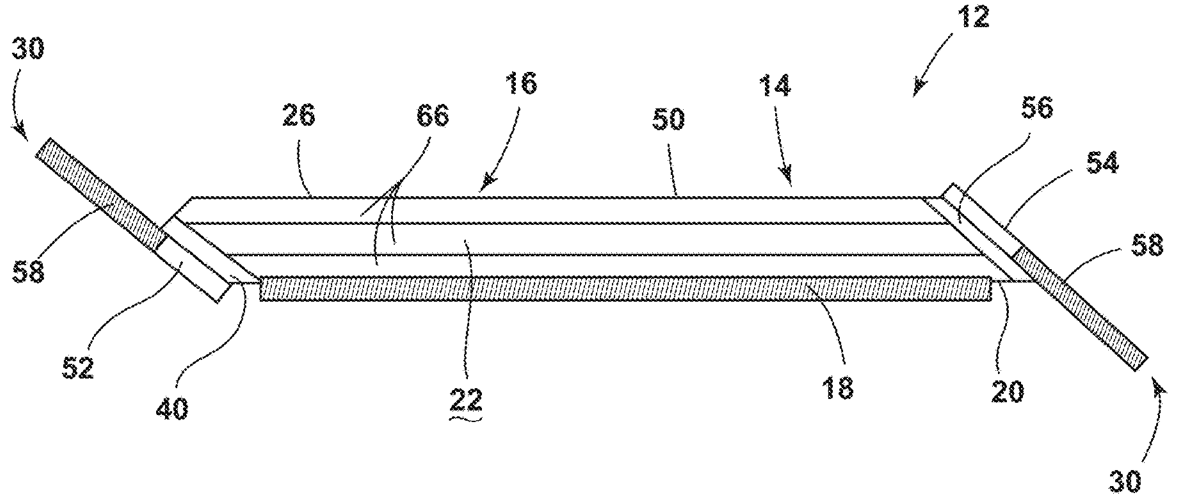
FIG. 5 is a bottom plan view of the therapeutic wrap of FIG. 4, according to the present disclosure.

Referring to FIGS. 3-5, an additional or alternative configuration of the treatment assembly 12 includes the flexible member 14 configured as a wrap or a therapeutic wrap 50. The therapeutic wrap 50 may be configured as a spiral wrap configured to helically wind around the affected area, such as an arm as illustrated in FIG. 5, similar to the therapeutic wrap 38 illustrated in FIGS. 1 and 2. It is contemplated that the therapeutic wrap 50 may be a spiral wrap, as illustrated in FIGS. 3-5, or alternatively may be any type of therapeutic device that surrounds or covers the affected area to provide treatment, such as, for example, a sleeve, a sock, another garment, another type of covering, etc.

The therapeutic wrap 50 generally includes the first coupling feature 18 that extends along the first edge 20 of the first surface 22 of the therapeutic wrap 50 and the second coupling feature 24 that extends along the second edge 26 of the second surface 28. The first and second coupling features 18, 24 are configured to engage one another to retain the therapeutic wrap 50 in the helix shape when the therapeutic wrap 50 is disposed on the affected area and when the therapeutic wrap 50 is slidably moved relative to the affected area.

The therapeutic wrap 50 includes two retaining features 30, which are configured as a first or distal elongated flap 52 and a second or proximal elongated flap 54. The distal elongated flap 52 extends from the distal end 40 of the therapeutic wrap 50 and the proximal elongated flap 54 extends from a proximal end 56 of the therapeutic wrap 50. The elongated flaps 52, 54 may extend along opposing edges of the therapeutic wrap 50, where the opposing edges extend between the first and second edges 20, 26. The first or distal elongated flap 52 may extend from the first edge 20 and extend beyond the second edge 26. The second or proximal elongated flap 54 may be rotated approximately 90° compared to the first elongated flap 52 and extend from the second edge 26 of the therapeutic wrap 50 and beyond the first edge 20. The elongated flaps 52, 54 are generally arranged parallel to one another and at an oblique angle relative to the longitudinal extent of the therapeutic wrap 50.

Each elongated flap 52, 54 may include a first fastening member 58 on the first surface 22 and a second fastening member 60 on the second surface 28. The first and second fastening members 58, 60 may be Velcro®, hook-and-loop fasteners, snap features, or any other similar fastening features configured to engage one another. The first and second fastening members 58, 60 of each elongated flap 52, 54 are configured to engage one another to retain the therapeutic wrap 50 in the selected position on the affected area.

Referring still to FIGS. 3-5, the therapeutic wrap 50 may be placed with the distal elongated flap 52 adjacent to the wrist. The distal elongated flap 52 is configured to circle the wrist and overlap itself. In the illustrated configuration, the second fastening member 60 faces outwardly from the skin of the patient and is engaged by the first fastening member 58 when the distal elongated flap 52 overlaps itself. The alignment of the distal elongated flap 52 on the wrist provides for the angled spiraling of the therapeutic wrap 50.

The distal elongated flap 52 operates as a cuff for retaining the distal end 40 of the therapeutic wrap 50 in the selected position on the affected area.

After the patient has wound the therapeutic wrap 50 around the affected area and reached the second or proximal elongated flap 54, the proximal elongated flap 54 may be utilized to retain the proximal end 56 of the therapeutic wrap 50 in the selected position adjacent to the shoulder of the patient. It is also contemplated that the proximal elongated flap 54 may retain the proximal end 56 of the therapeutic wrap 50 adjacent to the elbow of the patient depending on the configuration of the therapeutic wrap 50. Similar to the distal elongated flap 52, the proximal elongated flap 54 circles the upper arm and overlaps itself to engage the first fastening member 58 with the second fastening member 60. The elongated flaps 52, 54 may be advantageous for securing both the distal end 40 and the proximal end 56 of the therapeutic wrap 50 in the selected position on the arm to apply the treatment to the affected area.

To remove the therapeutic wrap 50, the patient may disengage the first fastening member 58 from the second fastening member 60 on each of the elongated flaps 52, 54. The patient may then slide the therapeutic wrap 50 from the affected area with the therapeutic wrap 50 maintaining the helix shape via the engagement between the first and second coupling features 18, 24. To reapply the therapeutic wrap 50, the patient can slide the therapeutic wrap 50 over the affected area and engage the elongated flaps 52, 54. To readjust the size of the helix shape, the patient may unwind and rewind the therapeutic wrap 50. While the therapeutic wrap 50 is illustrated on an arm, it is contemplated that the therapeutic wrap 50 may be wrapped around a leg without departing from the teachings herein.

Referring to FIGS. 1-5, the flexible member 14 of the treatment assembly 12 is generally constructed of two layers of fabric or other material. The two layers are coupled to one another at the first edge 20 and the second edge 26. The actuators 16 in the configurations set forth in FIGS. 1-5 are configured as channels 66A-66C, collectively referred to as channels 66, which extend along the longitudinal extent of the flexible member 14. Generally, the channels 66 are arranged parallel to one another and extend between the distal end 40 and the proximal end 56 of the flexible member 14. However, it is contemplated that the channels 66 may taper approximate the distal end 40 or the proximal end 56 based on the size and shape of the affected area (e.g., the wrist compared to the upper arm). The two layers of the flexible member 14 are coupled to one another between each channel 66 to define the channels 66.

Each channel 66 is adjustable between the deployed state and the non-deployed state. The deployed state may be an inflated condition of each channel 66, and the non-deployed state may be a deflated condition of each channel 66. When in the deployed state, the channels 66 apply pressure to the affected area.

It is generally contemplated that each channel 66 is in fluid communication with a pump 68, which is configured to adjust each channel 66 to the deployed state via a corresponding inlet 70 defined in the proximal end 56 of the flexible member 14. In the illustrated example, the flexible member 14 defines the three channels 66 that extend the entire longitudinal extent of the flexible member 14 and three inlets 70. It is contemplated that the channels 66 may be separated into zones along the longitudinal extent of the flexible member 14. In such configurations, the flexible member 14 may define additional inlets 70 corresponding with each zone.

Referring still to FIGS. 1-5, the pump 68 may be operably coupled to the proximal end 56 of the flexible member 14 proximate the shoulder of the patient. The pump 68 may direct fluid into one or more of the channels 66. The fluid may be a gas, a liquid, a gel, or any other fluid. The pump 68 may direct the fluid into the selected channel 66 to provide massage therapy to the affected area. As the fluid is directed into the channels 66 at the proximal end 56, the fluid travels along the channels 66 to the distal end 40 of the flexible member 14, as indicated by arrow 72, and adjust the distal end 40 of the channels 66 to the deployed state. As the distal end 40 is adjusted to the deployed state, the channels 66 will inflate from the distal end 40 to the proximal end 56. The amount of fluid directed into the channels 66 may affect the amount of pressure applied to the affected area.

Based on the helix shape of the flexible member 14, at the distal end 40 of the flexible member 14, the channel 66A may be disposed closer to the wrist than channel 66B, and channel 66B may be disposed closer to the wrist than channel 66C. Accordingly, the channel 66A may be adjusted to the deployed state first, followed by the channel 66B, and then the channel 66C to further contribute to a spiral pressure wave. This configuration produces the spiral pressure wave or a directional pattern of pressure from the wrist to the shoulder as indicated by arrow 74. The spiral pressure wave pushes fluid up the arm toward the trunk of the body. The fluid is pushed out of the limb toward the heart to be combined with the circulatory system.

To adjust each channel 66 from the deployed state to the non-deployed state, the connection between the pump 68 and the channels 66 may be interrupted. Alternatively, the pump 68 may be configured to remove or vacuum the fluid from the channels 66. The fluid may be stored by the treatment assembly 12 when the channels 66 are in the non-deployed state for use when subsequently adjusting the channels 66 to the deployed state.

Referring still to FIGS. 1-5, the treatment assembly 12 includes a control assembly 80 operably coupled to the proximal end 56 of the flexible member 14. The control assembly 80 generally includes a controller 82, a power source 84 (FIG. 18), and the pump 68, all disposed within a housing 86. The housing 86 may extend over the inlets 70 to position the pump 68 in fluid communication with the inlets 70 while obscuring any connection or tubing from view. Any connection or tubing may then be contained within the housing 86, to provide a greater range of movement and flexibility to the patient of the flexible member 14. The controller 82 is configured to activate and deactivate the pump 68 to adjust the channels 66 between the deployed state and the non-deployed state. The patient may connect the control assembly 80 to the flexible member 14 after applying the flexible member 14 to the affected area. Additionally or alternatively, the control assembly 80 may remain connected to the flexible member 14.

The treatment assembly 12 includes a user-interface 90 for receiving inputs from the patient regarding the operation of the health management system 10. For example, the user-interface 90 may include buttons 92 on the housing 86. The patient may input a command into the user-interface 90, which may be communicated to the controller 82. In response to the input, the controller 82 may activate or deactivate the pump 68. A specific massage therapy protocol or an adjustment to the current massage therapy protocol may be controlled through the user-interface 90.

Referring still to FIGS. 1-5, conventional wraps may be time-consuming to wrap, unwrap, and rewrap around the affected area for each treatment. The therapeutic wraps 38, 50 disclosed herein may retain the helix shape through the engagement between the first coupling feature 18 and the second coupling feature 24 while sliding the therapeutic wraps 38, 50 on and off the affected area. The actuators 16 are configured to adjust from the deployed state to push fluid out of the affected area to recombine with the circulatory system.

Figure 6:
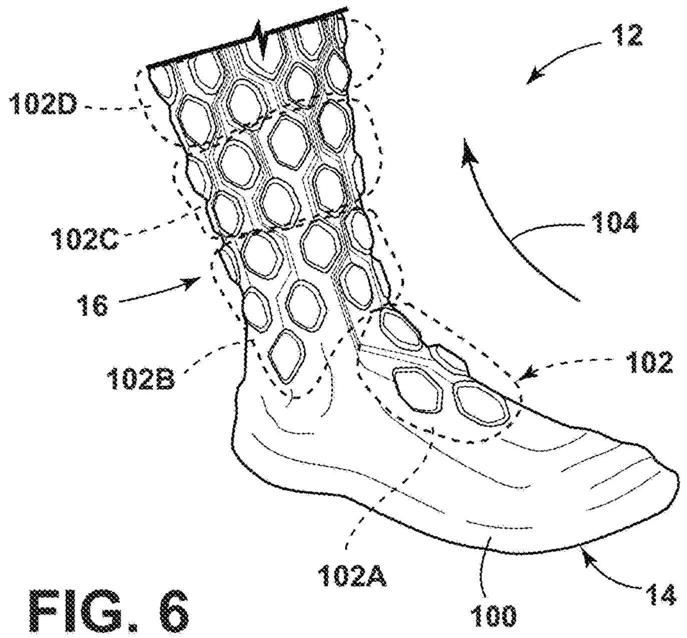
FIG. 6 is a side perspective view of a sock worn on a leg of a patient, according to the present disclosure.
Figure 7:
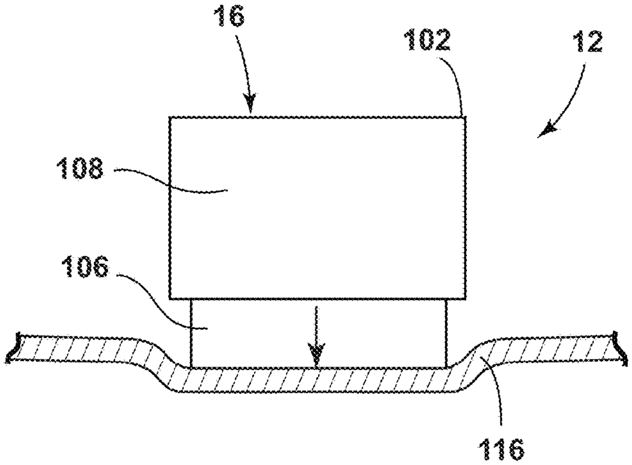
FIG. 7 is a schematic view of a voice coil actuator in a deployed state affecting pressure on an engagement layer, according to the present disclosure.

With reference to FIGS. 6 and 7, an additional or alternative configuration of the treatment assembly 12 is illustrated where the flexible member 14 is configured as a garment, such as a sock 100. The sock 100 may be operably coupled with the actuators 16, which are each configured as an electromagnetic linear actuator, such as a voice coil 102. It is contemplated that the actuators 16 may be, for example, voice coils 102 with a moving magnet, voice coils 102 with a moving coil, speaker coils, any other electromagnetic linear actuator, or any other type of electromagnetic actuator. Each voice coil 102 is adjustable between the non-deployed state and the deployed state. The non-deployed state may be a retracted condition of each voice coil 102, and the deployed state may be an extended condition of each voice coil 102 to apply pressure to the affected area. The voice coils 102 may be arranged in any practicable pattern or arrangement, such as in the illustrated voice coil group 102A-102D, along the sock 100 to provide a directional pattern of pressure, as indicated by arrow 104, from the foot toward the knee or hip of the patient. For example, the voice coils 102 may be arranged to substantially cover the sock 100 around the leg and top of the foot.

Each voice coil 102 is a linear actuator that extends and retracts to apply pressure to and remove pressure from the affected area. Generally, each voice coil 102 includes a coil assembly 106 and a magnetic field assembly 108. The coil assembly 106 slides relative to the magnetic field assembly 108, thereby adjusting the voice coil 102 between the deployed and non-deployed states. The current flowing through the coil assembly 106 may interact with a magnetic field generated by the magnetic field assembly 108 and generate a force vector. The force vector may be perpendicular to the direction of the current flowing through the coil assembly 106, thereby moving the coil assembly 106 relative to the magnetic field assembly 108. Reversing the movement of the coil assembly 106 may be accomplished through changing the polarity of the current flowing through the coil assembly 106.

Each voice coil 102 may directly engage the skin of the patient. In such examples, the voice coils 102 are operably coupled to an inner surface of the sock 100. Additionally or alternatively, the sock 100 may define apertures and the coil assembly 106 for each voice coil 102 may extend through a corresponding aperture when the voice coil 102 is in the deployed state to press against the skin of the patient. In another non-limiting example, the voice coils 102 may press against one layer of fabric of the sock 100 and press the layer of fabric against the skin of the patient (as best illustrated in FIG. 7).

Figure 18:
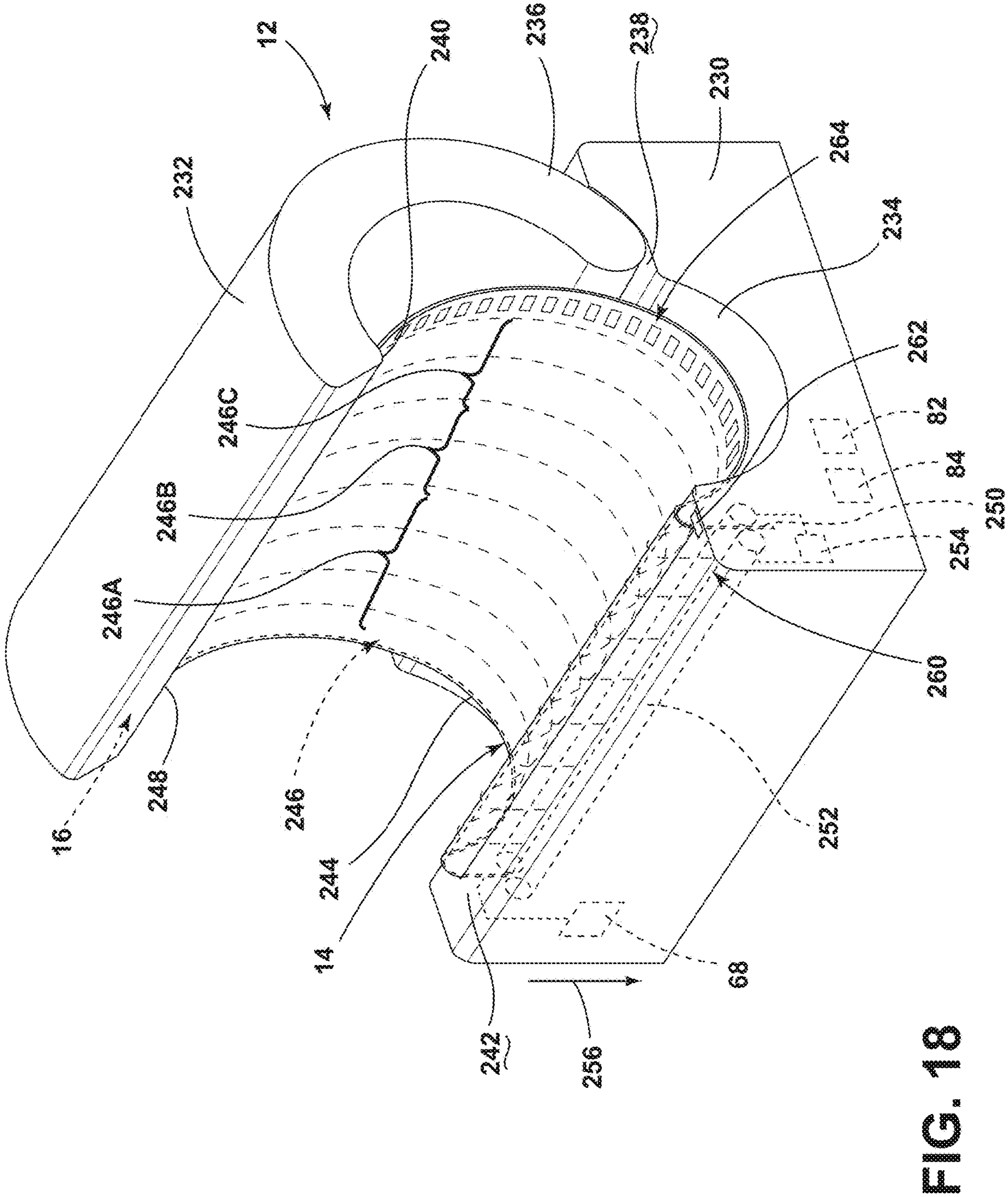
FIG. 18 is a schematic side perspective view of a treatment assembly with a sling that includes actuators with the treatment assembly in an open position, according to the present disclosure.

Referring still to FIGS. 6 and 7, each voice coil 102 may be adjusted in response to a voltage supplied by the power source 84 (FIG. 18). The voice coils 102 may be organized into voice coil groups, which are illustrated as the voice coil group 102A-102D, and collectively referred to herein as the voice coils 102. Depending on the length of the sock 100 or other garments, the sock 100 may include any practical number of groups of the voice coils 102. The voice coils 102 may be configured to be activated sequentially from a distal portion of the leg to a proximal portion of the leg. Accordingly, the voice coil group 102A arranged on the foot of the patient may be adjusted to the deployed state first. The voltage may be applied to the voice coil group 102A to adjust the coil assemblies 106 to apply pressure to the foot, thereby driving fluid out of the foot toward the ankle.

The voice coil group 102B disposed around the ankle may be adjusted to the deployed state next. The voice coil group 102B may apply pressure to the skin of the ankle, thereby pressing fluid further up the leg away from the ankle. The voice coil group 102A may remain in the deployed state to prevent fluid from returning to the foot in response to the pressure applied by the voice coil group 102B. The voice coil group 102C may be adjusted to the deployed state next to further drive fluid up the leg toward the knee. As the voice coil group 102C is adjusted to the deployed state, the voice coil group 102A may be adjusted to the non-deployed state to remove the pressure from the foot. The voice coil group 102B may remain in the deployed state to prevent fluid from moving back toward the foot in response to the pressure applied by the voice coil group 102C. The voice coil group 102D, and any additional groups of voice coils 102, may be configured to adjust to the deployed state in a similar sequential manner until reaching a proximal end of the sock 100.

The sequential adjustment of the voice coils 102 to the deployed state generally provides a wave of pressure, as indicated by the arrow 104. The direction of the pressure generally drives fluid out of the limb and to the central core of the body. The pressure wave may be continued over the period of time of the selected massage therapy protocol. The amount of pressure applied by each voice coil 102 may be proportional to the amount of voltage applied to the voice coil 102, which may be adjusted through the user-interface 90 (FIG. 18). Each coil group may be adjusted to the deployed state simultaneously or may be adjusted in a pattern from the distal voice coil 102 to the proximal voice coil 102. While the treatment assembly 12 is illustrated as the sock 100, it is contemplated that the treatment assembly 12 may be configured as other types of garments, including a sleeve or a shirt.

As illustrated in FIG. 7, the voice coils 102 may indirectly apply pressure to the skin of the patient by affecting pressure on an engagement layer 116. The engagement layer 116 may be disposed between the skin of the patient and each voice coil 102. When the voice coils 102 are in the deployed state, the coil assembly 106 may press into the engagement layer 116, consequently, pressing the engagement layer 116 against the skin of the patient to apply pressure to the affected area. As the coil assembly 106 retracts to the non-deployed state, the engagement layer 116 may return to an original condition, thereby removing pressure from the skin of the patient.

The engagement layer 116 may have a variety of configurations. For example, the engagement layer 116 may include a fabric or other materials that form the sock 100. The engagement layer 116 may be an additional layer of fabric coupled to the sock 100. Additionally or alternatively, the engagement layer 116 may include a polymeric or elastomeric material, such as rubber. In another example, the engagement layer 116 may be a layer of gel or gel beads. In an additional example, the engagement layer 116 may include a bladder filled with a fluid or gas. In configurations, the voice coil 102 may shift the fluid within the bladder to an area adjacent to the voice coil 102 thereby applying pressure around the voice coil 102 rather than or in addition to directly between the voice coil 102 and the skin of the patient. Further, the engagement layer 116 may include a textured pattern that abuts the skin to massage the skin as the voice coil 102 adjusts to the deployed state.

Figure 8:
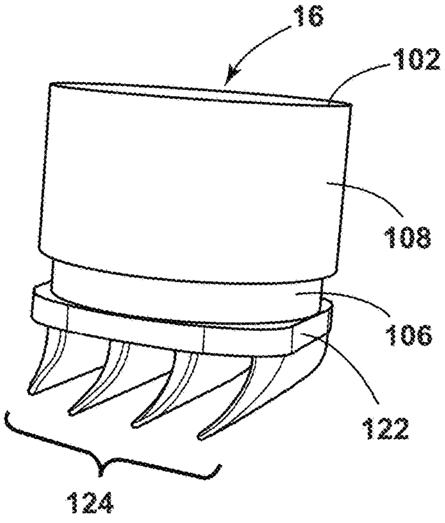
FIG. 8 is a schematic view of a voice coil actuator with a guide member, according to the present disclosure.

Referring to FIG. 8, in an additional or alternative configuration of the voice coil 102, a guide member 122 may be operably coupled to the coil assembly 106 of each voice coil 102. The guide member 122 generally includes flexible projections 124 extending away from the magnetic field assembly 108. The guide member 122 is adjusted with the movement of the coil assembly 106.

Figure 9A:
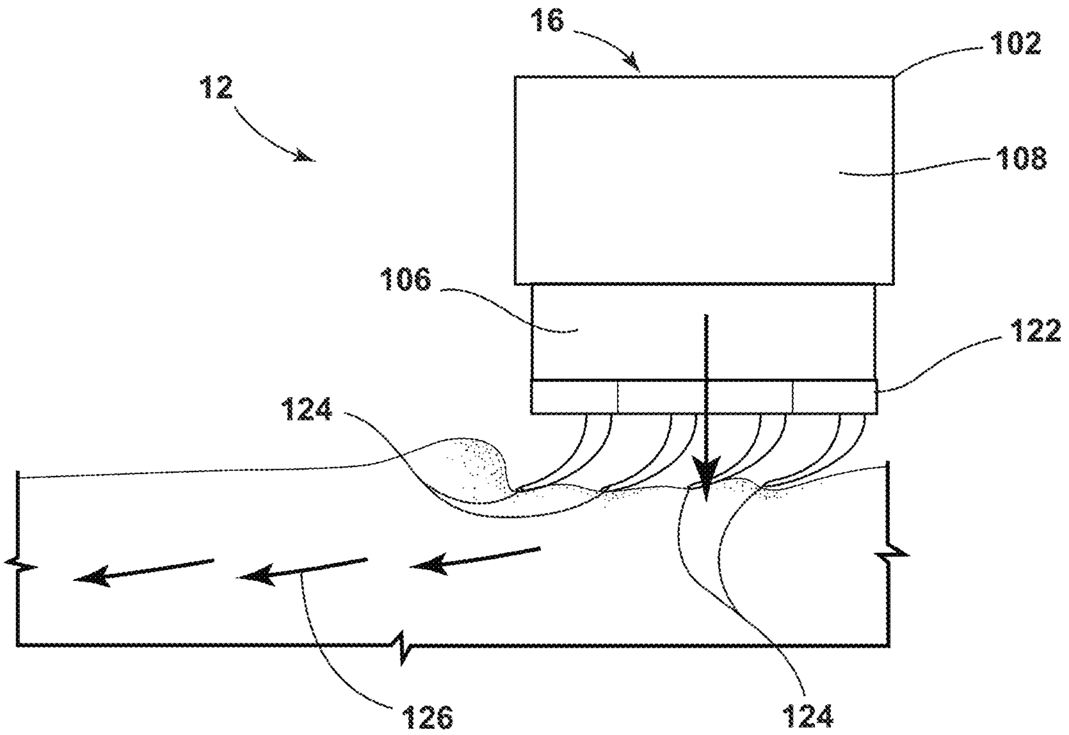
FIG. 9A is a schematic view of a voice coil actuator with a guide member in a deployed state and providing pressure on the skin of a patient, according to the present disclosure.
Figure 9B:
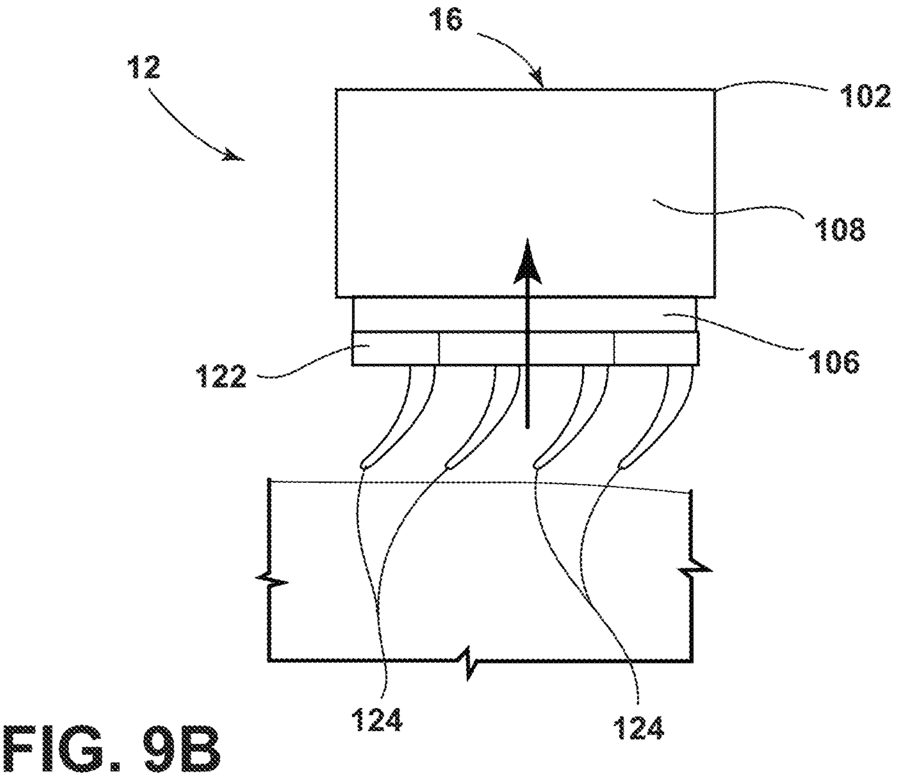
FIG. 9B is a schematic view of a voice coil actuator with a guide member in a non-deployed state and spaced from the skin of a patient, according to the present disclosure.

Referring still to FIG. 8, as well as to FIGS. 9A and 9B, the flexible projections 124 are configured to apply directional pressure, as indicated by arrow 126. Accordingly, the flexible projections 124 are configured to provide greater pressure in the direction 126 and minimal or no pressure in the direction opposite the direction 126. The flexible projections 124 may provide uniform or varying pressure based on the shape and arrangement of the flexible projections 124. In the illustrated configuration, the flexible projections 124 are arranged generally parallel to one another and have similar shapes. However, other configurations are contemplated based on the pressure to be applied against the skin of the patient.

As illustrated in FIG. 9A, the flexible projections 124 are curved in the same direction to push against the skin in the direction 126 as the voice coil 102 is adjusted to the deployed state. The flexible projections 124 are arranged so the direction of the pressure is toward the trunk or central core of the body. Accordingly, the voice coils 102 with the guide member 122 are configured to press against the skin in two directions (e.g., against the skin and in the direction 126).

As the voice coil 102 is retracted to the non-deployed state, as illustrated in FIG. 9B, the flexible projections 124 may slide against and move away from the skin. Due to the curvature of the flexible projections 124, as the voice coil 102 is adjusted to the non-deployed state, the flexible projections 124 may not apply significant pressure in a direction opposite the direction 126 as the voice coil 102 is adjusted to the non-deployed state. Accordingly, the flexible projections 124 may provide greater resistance and pressure when moving in one direction (e.g., the direction 126) against the skin compared to the opposing direction. In this way, the voice coils 102 massage the skin in a single direction, which promotes the movement of fluid in the direction 126 toward the central core of the body. It is contemplated that the flexible projections 124 may directly contact the skin of the patient, or alternatively may contact the engagement layer 116 (FIG. 7).

Figure 10:
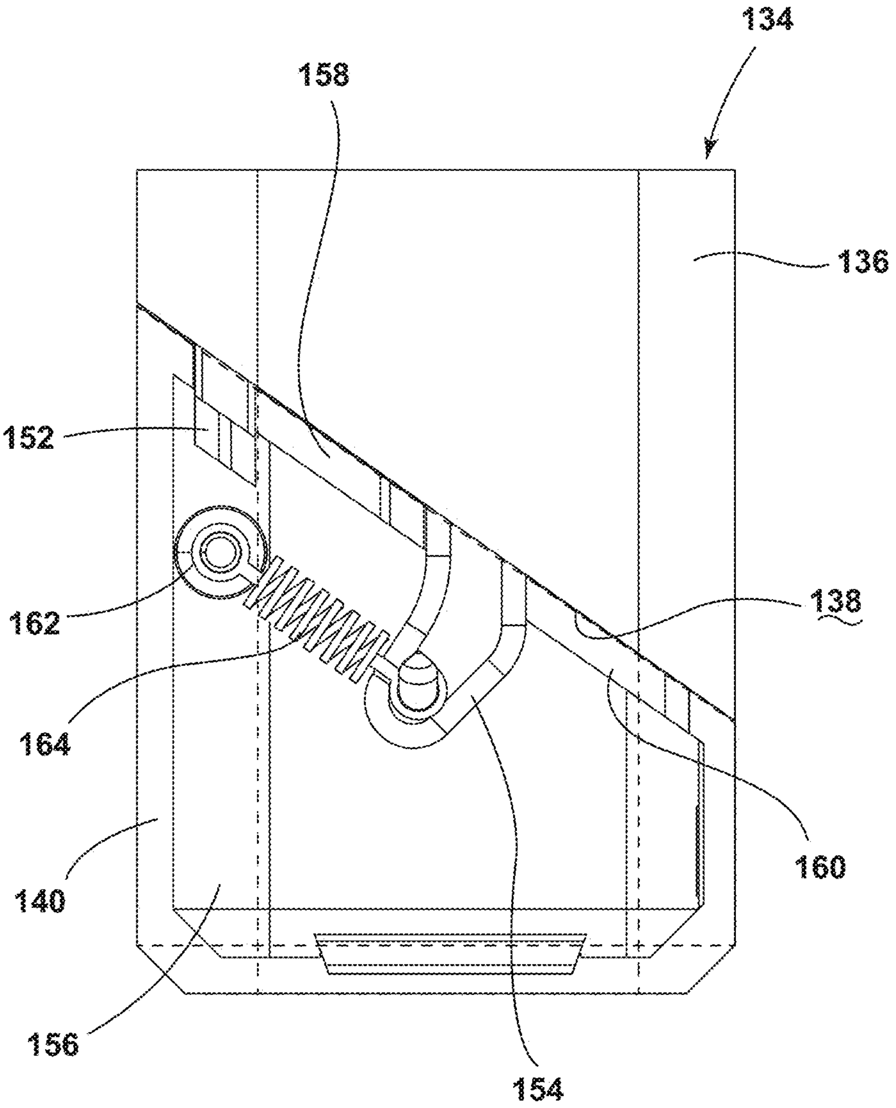
FIG. 10 is a front view of a slide assembly of a treatment assembly with a portion of a slide illustrated in phantom, according to the present disclosure.

With reference to FIG. 10, the sock 100 may include a slide assembly 134 operably coupled to each voice coil 102 for translating force from a first direction, as applied by the voice coil 102, to a second direction. The slide assembly 134 may include an engagement feature 136 having a slide surface 138 and a slide 140 configured to slidably engage the slide surface 138.

The slide assembly 134 may be operable between a retracted condition and an extended condition based on the state of the voice coil 102. The engagement feature 136 includes a guide 152 and an arm 154 extending from the slide surface 138 into an interior 156 of the slide 140. The slide 140 defines two apertures 158, 160, with the guide 152 extending through one aperture 158 and the arm 154 extending to the other aperture 160. Additionally or alternatively, the slide 140 defines a protrusion 162 extending from an inner surface into the interior 156. A biasing member 164 may be operably coupled to each of the arm 154 and the protrusion 162. As illustrated, the biasing member 164 is arranged generally parallel to the slide surface 138 of the engagement feature 136. However, other configurations of the slide assembly 134 are contemplated without departing from the teachings herein.

The interface between the engagement feature 136 and the slide 140 may be diagonal or angled, such that both the engagement feature 136 and the slide 140 are substantially wedge-shaped. The wedge-shaped engagement feature 136 and slide 140 may mate to form a substantially cuboid or prism slide assembly 134. Moreover, the mating wedge-shapes of the engagement feature 136 and the slide 140 provide for the sliding movement of the slide 140 along the slide surface 138 between retracted and extended conditions.

Figure 11A:
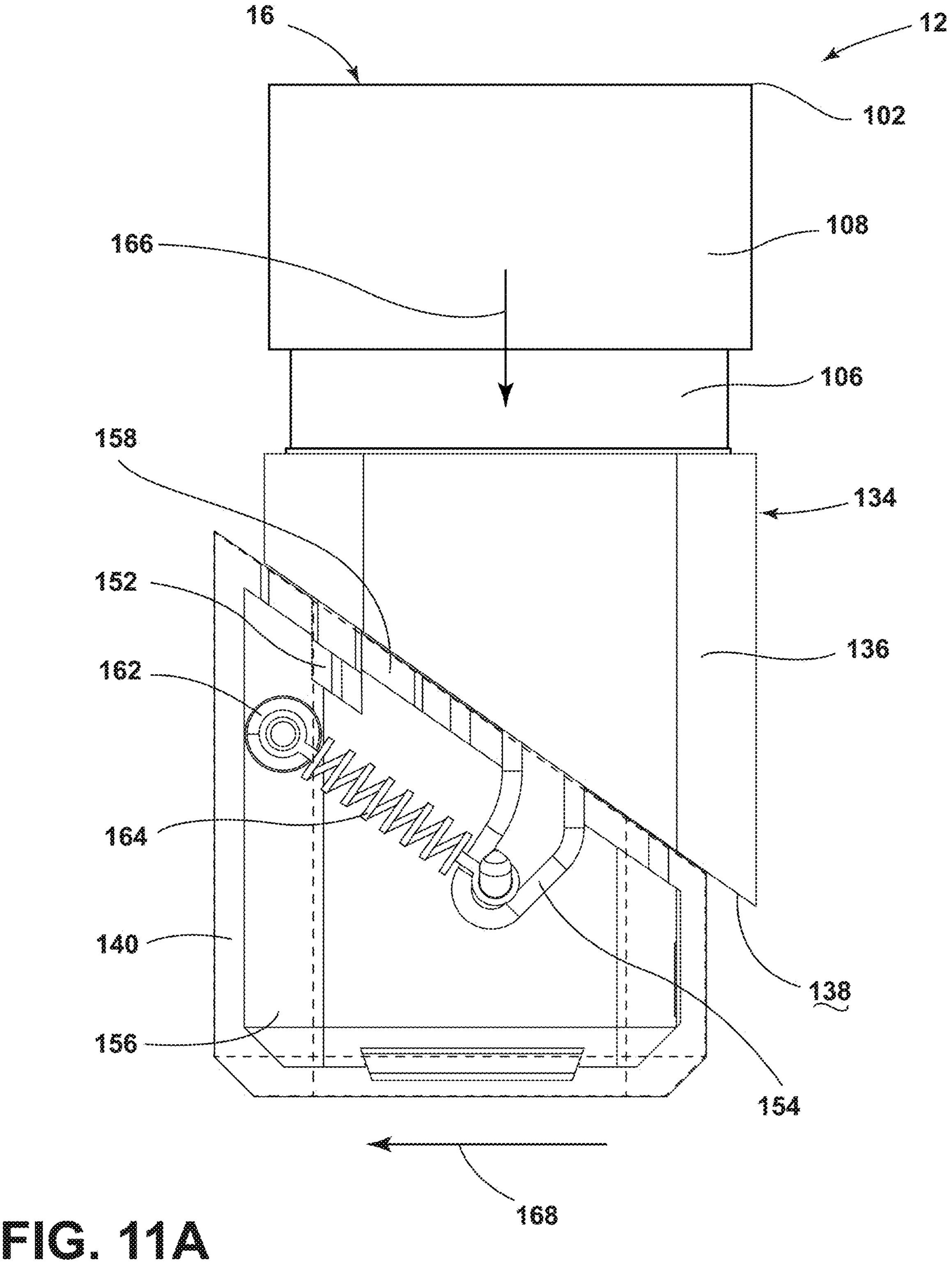
FIG. 11A is a schematic view of a voice coil actuator in a deployed state operably coupled with a slide assembly in an extended condition with a portion of a slide illustrated in phantom, according to the present disclosure.
Figure 11B:
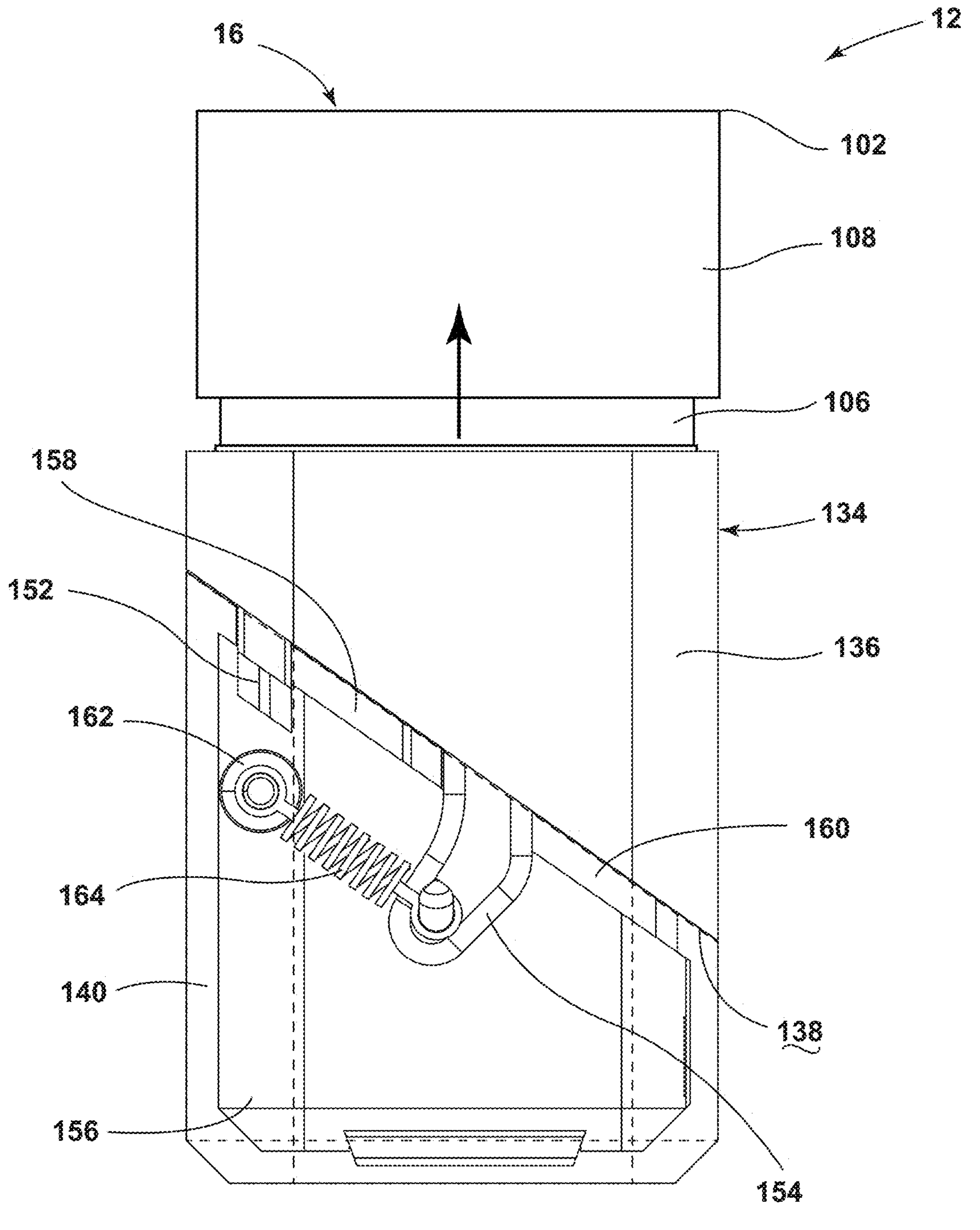
FIG. 11B is a schematic view of a voice coil actuator in a non-deployed state operably coupled with a slide assembly in a retracted condition with a portion of a slide illustrated in phantom, according to the present disclosure.

Referring again to FIG. 10, as well as FIGS. 11A and 11B, each voice coil 102 may be operably coupled with the slide assembly 134. The slide assembly 134 is configured to adjust between the retracted condition and the extended condition. When the voice coil 102 is in the deployed state, as illustrated in FIG. 11A, the slide assembly 134 is adjusted to the extended condition with the slide 140 offset from the engagement feature 136. The coil assembly 106 of the voice coil 102 presses onto the engagement feature 136, thereby shifting the engagement feature 136 in a first direction, as indicated by arrow 166, toward the skin of the patient. Due to the angled interface of the slide assembly 134, as the engagement feature 136 is shifted in the direction 166, the slide 140 adjusts in a second direction, indicated by arrow 168, by sliding along the slide surface 138 until the slide assembly 134 is in the extended condition.

As illustrated in FIG. 11A, the second direction 168 of the slide 140 is substantially perpendicular to the first direction 166 of the force applied by the voice coil 102. Accordingly, the slide assembly 134 may translate the force of the voice coil 102 from the direction 166 to the direction 168 to apply a downward and sliding force on the skin of the patient. The directional pressure in the direction 168 is generally directed to the central core of the patient to drive fluid toward the circulatory system to be processed. The force applied by the voice coil 102 may overcome the biasing force of the biasing member 164 to shift the slide 140 relative to the engagement feature 136. It is contemplated that the slide assembly 134 may be used in conjunction with the engagement layer 116 (FIG. 7). In such configurations, the slide assembly 134 may affect pressure downward and in the direction 168 on the engagement layer 116, which consequently affects the same or similar pressure on the skin of the patient.

As the voice coil 102 is adjusted to the non-deployed state, as illustrated in FIG. 11B, the slide assembly 134 may adjust to the retracted condition where the slide 140 is generally aligned with the engagement feature 136. The biasing force of the biasing member 164 retracts the slide 140 to its original position. As the voice coil 102 is not applying pressure to the slide assembly 134, the slide 140 may shift across the skin of the patient, applying minimal or no pressure. Accordingly, the voice coil 102 may engage the slide assembly 134 to apply pressure in the direction 166 into the skin and in the direction 168 along the skin to press fluid along the limb toward the trunk of the body. As the voice coil 102 is a linear actuator and applies pressure in a single direction, the use of the guide member 122 (FIGS. 8-9B) and/or the slide assembly 134 may be advantageous for applying a directional pressure on the skin of the patient.

Figure 12:
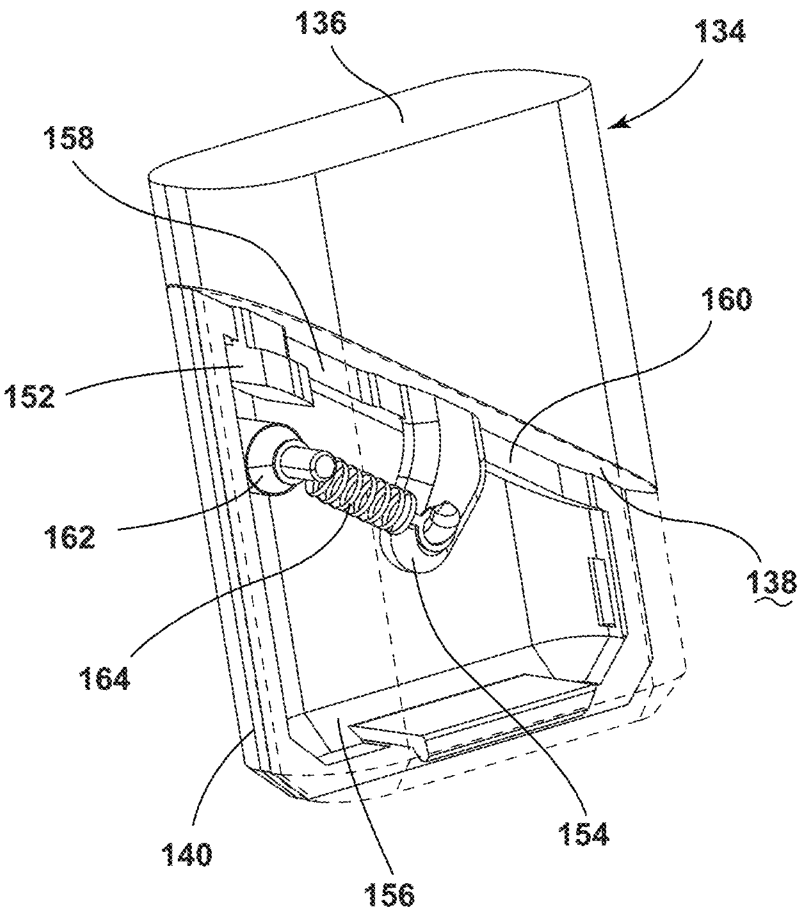
FIG. 12 is a side perspective view of a slide assembly of a treatment assembly with a portion of a slide illustrated in phantom, according to the present disclosure.

Referring to FIGS. 10-12, the apertures 158, 160 defined by the slide 140 may be elongated to form a track for the guide 152 and the arm 154. A portion of the guide 152 within the interior 156 of the slide 140 may have an increased width to maintain the connection between the engagement feature 136 and the slide 140. As illustrated in FIG. 12, when the slide assembly 134 is in the retracted condition, the guide 152 is positioned on one side (e.g., the left side) of the aperture 158, and the arm 154 is disposed on the same side of the aperture 160. As the slide 140 adjusts to the extended condition, the apertures 158, 160 adjust relative to the guide 152 and the arm 154, respectively. The slide 140 may move until each of the guide 152 and the arm 154 are disposed on the opposing side of the respective apertures 158, 160 (e.g., the right side). Accordingly, the apertures 158, 160 may define the fully retracted condition and the fully extended condition of the slide assembly 134.

Figure 13:
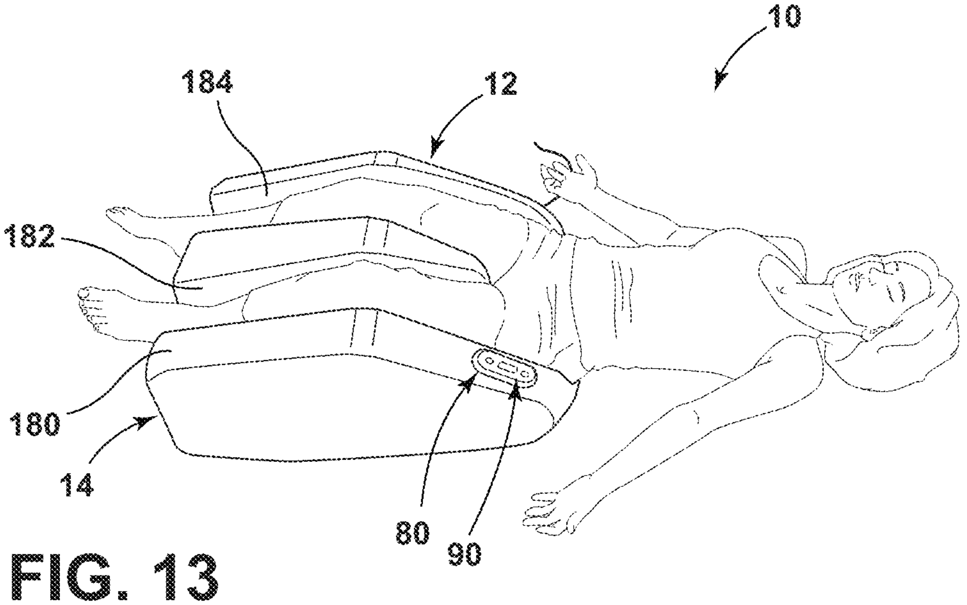
FIG. 13 is a schematic view of a pad providing treatment to a patient, according to the present disclosure.

Referring to FIG. 13, an additional or alternative configuration the health management system 10 includes the treatment assembly 12 configured as a support feature, such as a therapeutic pad 180. The therapeutic pad 180 is generally a cushion or foam block that may be placed on a floor, a bed, or other furniture, or alternatively may be a mattress or mattress pad. The therapeutic pad 180 defines elongated cavities 182, 184 configured to receive the legs (e.g., the affected area) of the patient. The therapeutic pad 180 may provide a massage therapy treatment to the patient who is resting on the therapeutic pad 180. The control assembly 80 with the user-interface 90 may be disposed on the surface of the therapeutic pad 180 within the reach of the patient when the patient is resting on the therapeutic pad 180. The therapeutic pad 180 may provide for a passive treatment system that provides a massage therapy protocol as the patient rests on the therapeutic pad 180 for a period of time. Other configurations of the therapeutic pad 180, for example with a single elongated cavity 182 or for receiving an arm, are contemplated without departing from the teachings herein.

Figure 14:
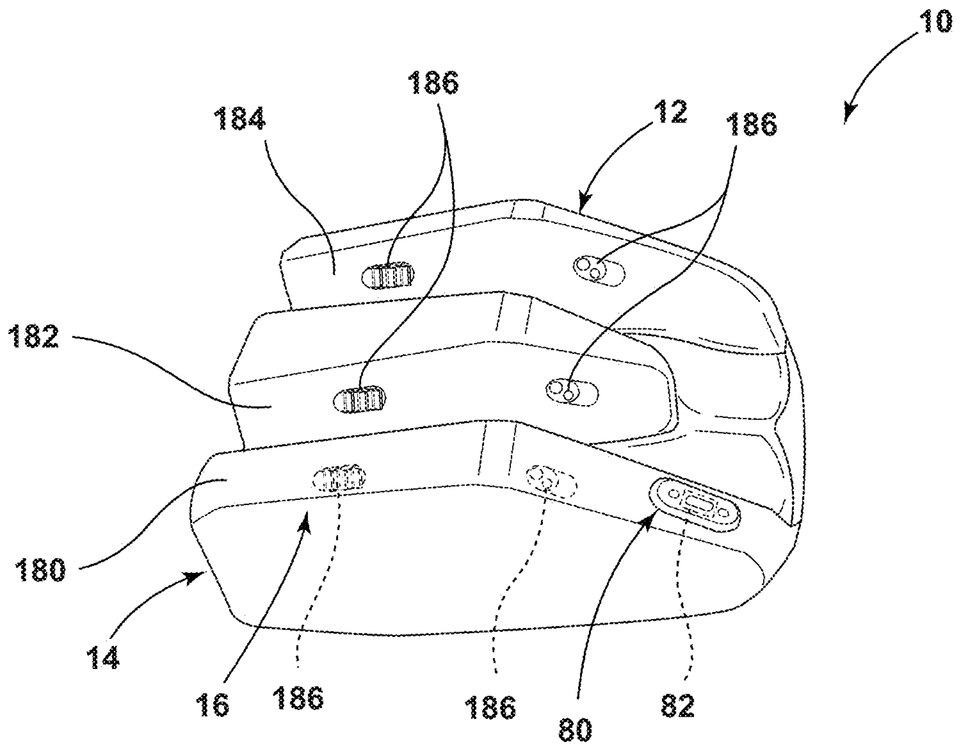
FIG. 14 is a side perspective view of a pad with massage devices, according to the present disclosure.

Referring to FIG. 14, the treatment assembly 12 includes the actuators 16 configured as massage devices 186. The massage devices 186 may be operably coupled with the therapeutic pad 180 within the cavities 182, 184. The massage devices 186 are operable between the deployed state and the non-deployed state. The deployed state may be an activated condition of each massage device 186, and the non-deployed state may be a deactivated condition of each massage device 186. When activated, each massage device 186 may apply pressure to the affected area.

The massage devices 186 may be placed in a selected position on the therapeutic pad 180 by the patient to provide a customizable treatment. The massage devices 186 may be arranged to apply pressure to each side or the back of each leg placed in the cavities 182, 184 depending on the location of the massage devices 186 as arranged by the user. The massage devices 186 may be coupled to the therapeutic pad 180 with snap features, Velcro®, hook-and-loop fasteners, or other fastening assemblies. Additionally or alternatively, the therapeutic pad 180 may define pockets to receive the massage devices 186.

The therapeutic pad 180 may include coupling features extending over a substantial portion, or the entire, surface in the cavities 182, 184 to allow the patient to couple the massage devices 186 at any location within the cavities 182, 184 to provide a customizable treatment for the user. In this way, the surface of the cavities 182, 184 may be substantially covered with coupling features to allow the massage devices 186 to be placed at any location along the cavities 182, 184. A covering may be used to conceal the massage devices 186 and the coupling features. It is also contemplated that the therapeutic pad 180 may include features on discrete portions of the surface within the cavities 182, 184 that provide specific locations for coupling the massage devices 186 to the therapeutic pad 180.

Figure 15:
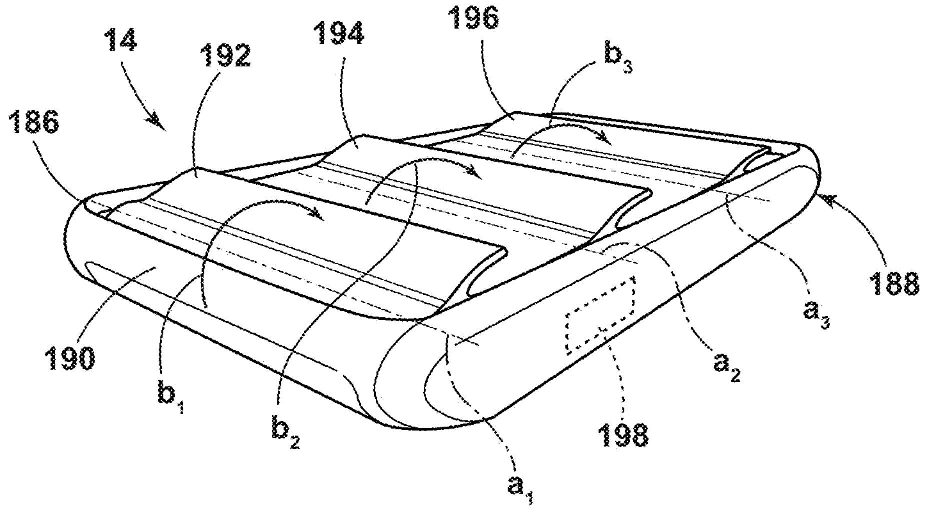
FIG. 15 is a side perspective view of a massage device, according to the present disclosure.

Referring to FIG. 15, an exemplary configuration of the massage device 186 is illustrated. The massage device 186 is configured as a pressure assembly 188 that applies directional pressure to the affected area. The pressure assembly 188 includes a support structure 190 configured to couple to the therapeutic pad 180 and a plurality of elongated projections 192, 194, 196 operably coupled to the support structure 190. The elongated projections 192, 194, 196 are disposed parallel to one another. Each elongated projection 192, 194, 196 is curved to apply greater pressure and resistance when rotating in one direction relative to the opposing direction.

In various examples, each elongated projection 192, 194, 196 is configured to rotate 360°. The elongated projection 192 is configured to rotate about a rotational axis $a_1$ in the direction of arrow $b_1$. Similarly, the elongated projection 194 is configured to rotate about a rotational axis $a_2$ in the direction of arrow $b_2$, and the elongated projection 196 is configured to rotate about a rotational axis $a_3$ in the direction of arrow $b_3$. In such configurations, the elongated projections 192, 194, 196 may apply the directional pressure when engaging the skin of the user. As each elongated projection 192, 194, 196 rotates, the elongated projections 192, 194, 196 will disengage the skin and rotate within the support structure 190 until once again engaging the skin.

Additionally or alternatively, each elongated projection 192, 194, 196 may rotate about 180°. In such configurations, the elongated projections 192, 194, 196 apply a directional pressure when rotating in a first direction (e.g., in the direction of arrows $b_1$, $b_2$, $b_3$, respectively) and apply minimal or no pressure when rotating in the opposing direction (e.g., in the direction opposite of arrows $b_1$, $b_2$, $b_3$, respectively) due to the curvature of the elongated projections 192, 194, 196. The elongated projections 192, 194, 196 may apply directional pressure to push fluid in a single direction, generally toward the trunk of the body to the circulatory system.

The pressure assembly 188 may include a motorized assembly 198 operably coupled to each elongated projection 192, 194, 196. The motorized assembly 198 may rotate the elongated projections 192, 194, 196 simultaneously or in a pattern based on the direction the elongated projections 192, 194, 196 are applying pressure. The motorized assembly 198 may be advantageous for automatically rotating the elongated projections 192, 194, 196 when the massage device 186 is in the deployed state. The motorized assembly 198 may include, for example, a motor and gears for rotating each of the elongated projections 192, 194, 196 simultaneously.

Figure 16:
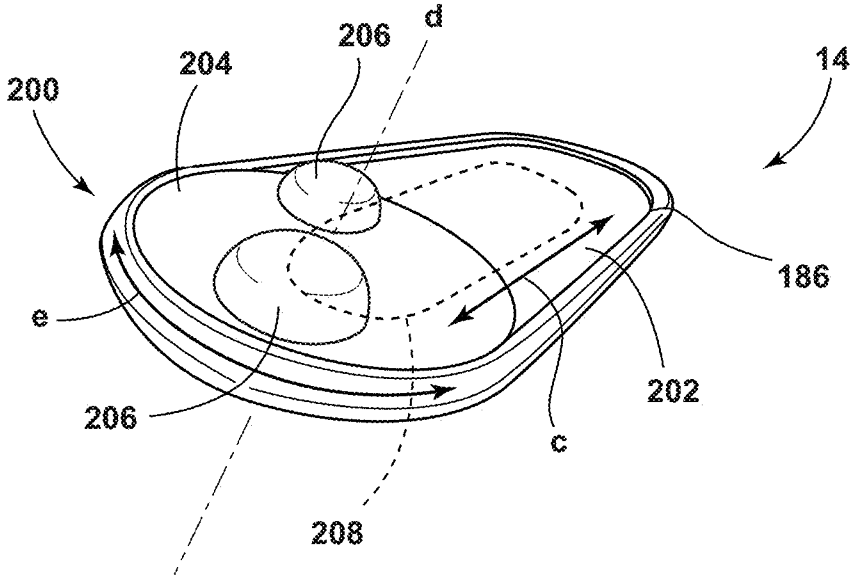
FIG. 16 is a side perspective view of a massage device, according to the present disclosure.

Referring to FIG. 16, an additional or alternative configuration of the massage device 186 is illustrated. The massage device 186 is configured as a pressure assembly 200 for applying general pressure to the affected area. The pressure assembly 200 includes a support structure 202 configured to couple to the therapeutic pad 180 and a massage feature 204 operably coupled to the support structure 202. The massage feature 204 is generally configured to slide along the longitudinal extent of the support structure 202, as illustrated by arrow c. Additionally or alternatively, the massage feature 204 may rotate about a rotational axis d as illustrated by arrow e, which may be generally perpendicular to the longitudinal extent of the support structure 202. The massage feature 204 includes protrusions 206 configured to engage the skin of the user. The massage feature 204 may include any practicable number of protrusions 206 of any practicable shape or size. The position of the protrusions 206 on the skin may be adjusted through the rotation and sliding movement of the massage feature 204. The pressure assembly 200 may apply general pressure to the skin of the patient to provide a massage treatment, but may not apply directional pressure similar to the pressure assembly 188 illustrated in FIG. 15. Accordingly, the pressure assembly 200 may apply general pressure to massage the selected area, but may not direct the fluid within the affected area in a single direction.

The pressure assembly 200 may include a motorized assembly 208 configured to slide and rotate the massage feature 204. The motorized assembly 208 is operably coupled to the massage feature 204 and the support structure 202. The motorized assembly 208 may rotate or translate the massage feature 204 to apply pressure and massage the skin. The motorized assembly 208 may be advantageous for adjusting the massage feature 204 when the massage device 186 is in the deployed state. The motorized assembly 208 may include, for example, a motor operably coupled with gears and/or rails to adjust the massage feature 204.

Referring to FIGS. 14-16, the massage devices 186 may be configured to be activated simultaneously or independently from one another based on the massage therapy protocol. The controller 82 may send a signal to each massage device 186 to apply pressure to the affected area. Each massage device 186 may include communication circuitry to receive the signal from the controller 82. Each massage device 186 may be a remote device separable from the therapeutic pad 180 and communicatively coupled to the controller 82.

Figure 17:
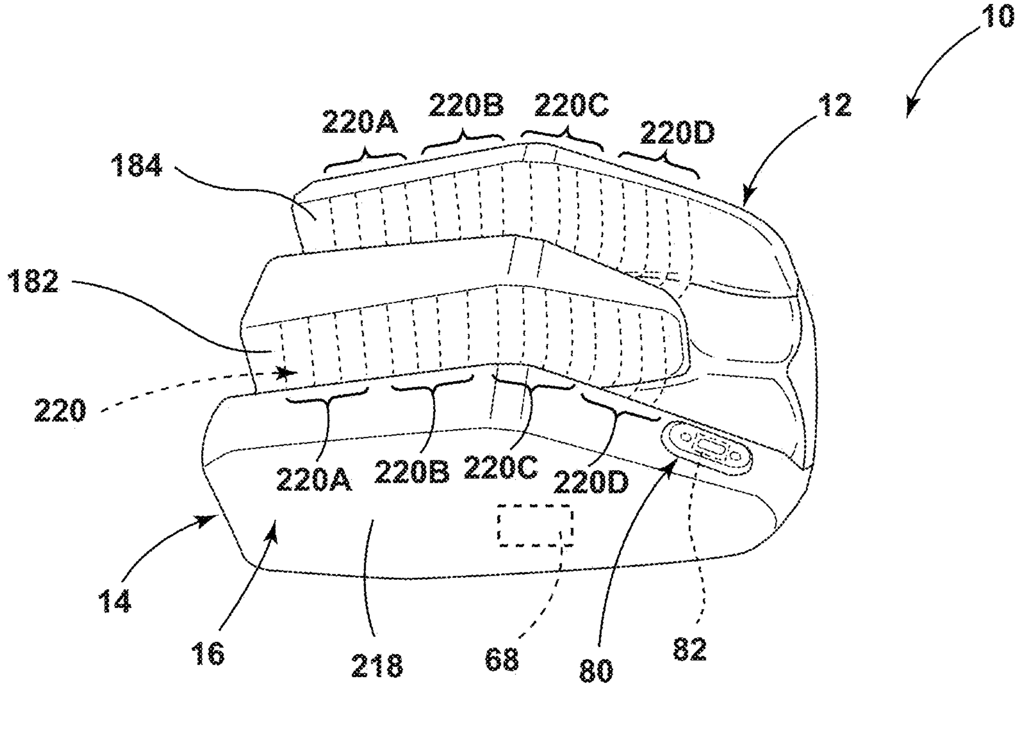
FIG. 17 is a side perspective view of a pad that includes bladders, according to the present disclosure.

Referring to FIG. 17, in an additional or alternative configuration the health management system 10 includes the treatment assembly 12 configured as a support feature, such as a therapeutic pad 218. The therapeutic pad 218 is generally a cushion or foam block that may be placed on a floor, a bed, or other furniture, or alternatively may be a mattress or mattress pad. The therapeutic pad 218 defines the cavities 182, 184 configured to receive the legs of the user. The therapeutic pad 218 includes the actuators 16 configured as bladders 220. The bladders 220 are arranged generally parallel to one another across the cavities 182, 184. Each bladder 220 is configured to engage the sides and the back of a leg of the user. Accordingly, each bladder 220 is generally U-shaped. It is also contemplated that multiple bladders 220 may be arranged to form each U-shape, such that the patient may apply massage treatment to one side of the leg or the back of the leg independently.

Each bladder 220 is adjustable between the deployed state and the non-deployed state. The deployed state may be an inflated condition of each bladder 220, and the non-deployed state may be a deflated condition of each bladder 220. The bladders 220 may be sequentially adjusted in accordance with the selected massage therapy protocol. For example, the bladders 220 may be sequentially adjusted to the deployed state from the ankle to the hip of each leg.

The bladders 220 may be arranged in bladder groups 220A-220D, which are collectively referred to as the bladders 220. The bladder group 220A adjacent to the ankle may be adjusted to the deployed state first, pushing fluid away from the foot and toward the knee of the user. The bladder group 220B may then be adjusted to the deployed state to further push the fluid toward the trunk of the body. The bladder group 220A may remain in the deployed state to prevent fluid from returning to the ankle area in response to the pressure applied by the bladder group 220B.

The bladder group 220C may then be adjusted to the deployed state, further driving the fluid up the leg toward the hip. As the bladder group 220C is adjusted to the deployed state, the bladder group 220A may be adjusted to the non-deployed state, thereby removing pressure from the ankle area. The bladder group 220D may then be adjusted to the deployed state to apply pressure on the upper portion of the leg. The bladders 220 may continue to be adjusted between the deployed state and the non-deployed state in a similar sequential manner. Each bladder 220 within the bladder groups 220A-220D may be adjusted simultaneously, or alternatively may be adjusted in a sequential pattern from a distal portion to a proximal portion. The bladder groups 220A-220D for each leg (e.g., in the cavities 182, 184) may be adjusted simultaneously or independently of one another based on the massage therapy protocol. It is contemplated that additional groups of bladders 220 may be included in the therapeutic pad 218.

The therapeutic pad 218 includes the pump 68 coupled thereto and in fluid communication with each bladder 220. The pump 68 is configured to direct fluid into each bladder 220 to adjust the bladders 220 to the deployed state. The amount of pressure applied by the bladders 220 may be adjusted by the amount of fluid directed into the bladders 220. To adjust the bladders 220 to the non-deployed state, the fluid communication between the bladders 220 and the pump 68 may be disrupted, or alternatively, the pump 68 may be configured to remove or vacuum the fluid from the bladders 220. The pump 68, as well as any tubing or connections extending between the pump 68 and each bladder 220, may be contained within the therapeutic pad 218, which may provide more convenient treatment for the user. Specifically, the patient may utilize the therapeutic pad 218 for a longer period of time without having to accommodate external tubes.

Referring to FIGS. 13-17, the therapeutic pads 180, 218 are generally more passive treatment options. The patient may rest his or her legs within the cavities 182, 184 for treatment. The therapeutic pads 180, 218 may be utilized for a longer duration of time, for example, over a period of hours. This may be advantageous for allowing the patient to use the therapeutic pads 180, 218 overnight or while sleeping, thereby providing treatment over a longer duration. The actuators 16 may be adjusted to the deployed state and remain in the deployed state for a period of time, for example, for a period of hours. Additionally or alternatively, the actuators 16 may be adjusted to the deployed state for a predetermined amount of time, for example, 15 minutes or 30 minutes, before being adjusted to the non-deployed state. In such configurations, the massage therapy protocol may provide continuous intervals of pressure for a period of hours. It is contemplated that the voice coils 102, as discussed previously herein, may be included in the therapeutic pads 180, 218. It is also contemplated that the therapeutic pads 180, 218 may include a single cavity for being used for treatment on an arm of the user.

Figure 19:
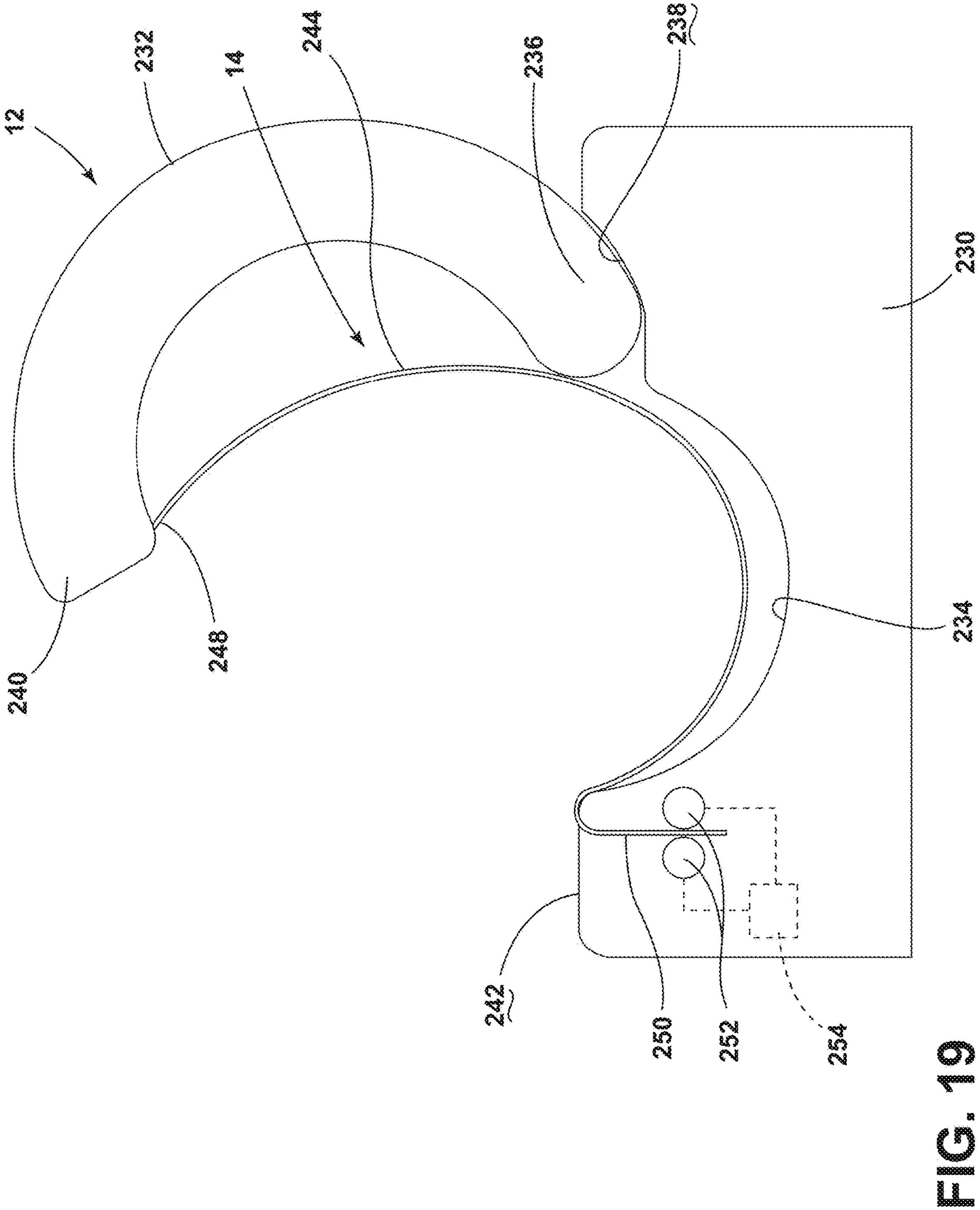
FIG. 19 is a schematic front elevational view of the treatment assembly of FIG. 18, according to the present disclosure.
Figure 20:
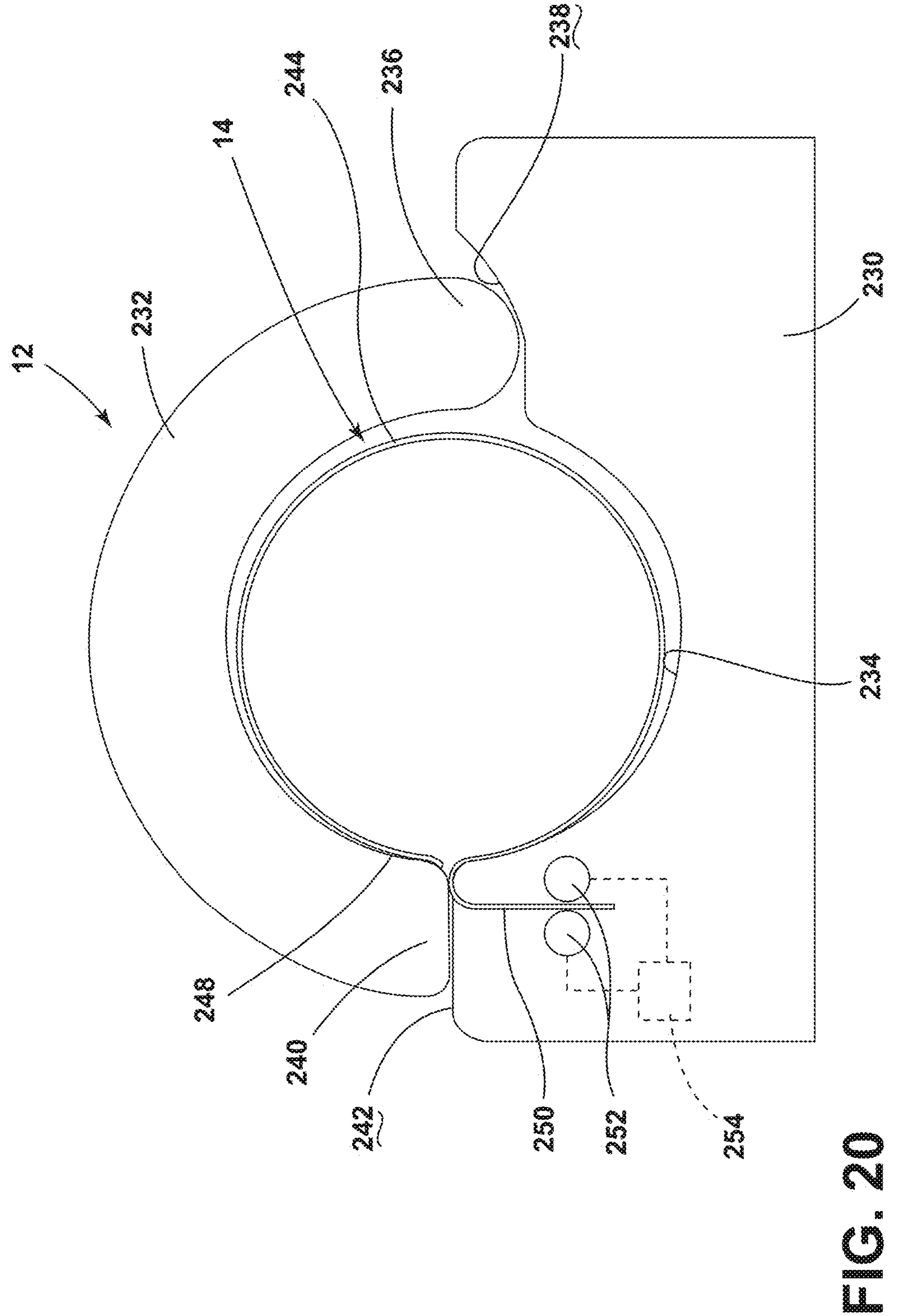
FIG. 20 is a schematic front elevational view of the treatment assembly of FIG. 18 in a closed position and the sling in a relaxed condition, according to the present disclosure.

Referring to FIGS. 18-21, in an additional or alternative configuration of the health management system 10, the treatment assembly 12 includes a base or therapeutic pad 230 operably coupled with a cover 232. The therapeutic pad 230 is generally a cushion or foam block that may be placed on a floor, a bed, or other furniture, or alternatively may be a mattress or mattress pad. The cover 232 is generally constructed of a similar material as the therapeutic pad 230. The therapeutic pad 230 defines a cavity 234 for receiving the affected area, such as a leg or an arm, of the patient. The cover 232 is operable between an opened position for inserting and removing the limb from the cavity 234, as illustrated in FIGS. 18 and 19, and a closed position for providing treatment to the patient, as illustrated in FIG. 20. The cover 232 is generally arcuate, such that when the cover 232 is in the closed position, the therapeutic pad 230 and the cover 232 extend entirely around the limb and defines a rounded space for the limb of the patient.

The cover 232 is pivotally coupled to the therapeutic pad 230 and operable between the opened and closed positions. A first edge 236 of the cover 232 remains engaged with the therapeutic pad 230 proximate an abutment surface 238 as the cover 232 is moved between the opened and closed positions. As best illustrated in FIG. 19, the abutment surface 238 is disposed adjacent to the cavity 234. When the cover 232 is in the opened position, an outer surface of the cover 232 rests against the abutment surface 238 to retain the cover 232 in the opened position. The abutment surface 238 defines the fully opened position and provides a stopping position of the cover 232. While illustrated as two components, the therapeutic pad 230 and the cover 232 may be a single component with a hinge, a living hinge, or another similar structure to allow the movement of the cover 232 between the opened and closed positions.

A second edge 240 of the cover 232 selectively engages a mating surface 242 of the therapeutic pad 230. When in the opened position, the second edge 240 of the cover 232 is free of a direct engagement with the mating surface 242 of the therapeutic pad 230. When in the closed position, the second edge 240 rests on the mating surface 242, enclosing the limb within the treatment assembly 12. The treatment assembly 12 may include a connector extending between the cover 232 and the therapeutic pad 230 to retain or lock the cover 232 in the closed position while treatment is provided.

Referring still to FIGS. 18-21, the treatment assembly 12 with the therapeutic pad 230 and the cover 232 includes the flexible member 14 configured as a sling 244, which includes the actuators 16 configured as bladders 246, illustrated in bladder groups 246A-246C. The sling 244 extends between the cover 232 and the therapeutic pad 230 and is configured to support the limb of the user. The sling 244 generally extends from the second edge 240 of the cover 232, along the underside of the cover 232, through the cavity 234, and is operably coupled to the mating surface 242 of the therapeutic pad 230. In this way, the sling 244 encircles the limb when the cover 232 is in the closed position. It is contemplated that the treatment assembly 12 may include a single sling 244, or a plurality of slings 244 arranged parallel to one another along the treatment assembly 12.

Figure 21:
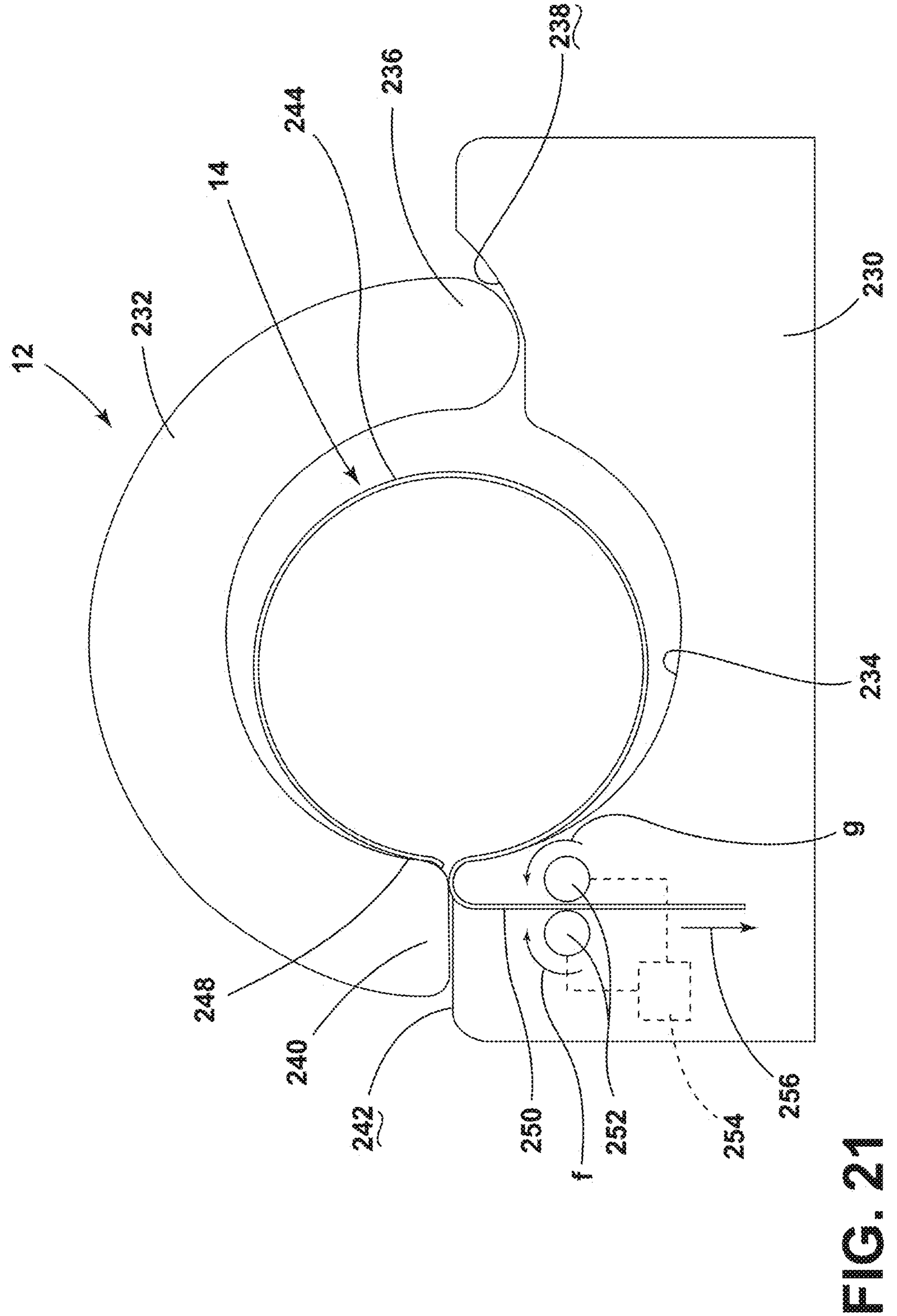
FIG. 21 is a schematic front elevational view of the treatment assembly of FIG. 20 with the sling in a fitted condition, according to the present disclosure.

Referring still to FIGS. 18, 20, and 21, the sling 244 is adjustable between a relaxed condition, as illustrated in FIG. 20, and a fitted condition, as illustrated in FIG. 21. When in the relaxed condition, the sling 244 generally fits loosely around the limb of the patient and may be spaced apart from the skin on the patient. When the sling 244 is in the fitted condition, the sling 244 extends along the skin of the patient in a snug or form fit state.

A first end 248 of the sling 244 is fixedly coupled to the second edge 240 of the cover 232. A second end 250 of the sling 244 is operably coupled with the therapeutic pad 230. As best illustrated in FIGS. 20 and 21, the second end 250 of the sling 244 extends into an interior of the therapeutic pad 230 adjacent to the cavity 234. The second end 250 is operably coupled with an adjustment device, such as rollers 252, which are operably coupled to or disposed within the therapeutic pad 230. The rollers 252 are operably coupled with a motor 254. When the motor 254 is activated, the rollers 252 are configured to adjust the sling 244 to the fitted condition by rotating in the direction of arrows f, g, respectively, and consequently pulling the second end 250 of the sling 244 in the direction of arrow 256. Generally, the rollers 252 spin inwards, towards one another and to shorten the length of the sling 244 in the cavity 234. The rollers 252 continue to adjust the sling 244 until a predetermined tension is reached. When the sling 244 reaches the predetermined tension, the motor 254 is deactivated, the rollers 252 cease rotating in the direction f, g, and the sling 244 fits snugly around the limb of the user. While illustrated as the rollers 252, it is contemplated that the adjusting device may be any device or structure configured to adjust the sling 244.

The rollers 252 may be used to adjust the cover 232 to the closed position, as well as pull the sling 244 to the fitted condition. As the rollers 252 adjust the sling 244 to the fitted condition, the sling 244 pulls on the cover 232 and automatically adjusts the cover 232 to the closed position. When the sling 244 is pulled to the predetermined tension, the predetermined tension may retain the cover 232 in the closed position. It is contemplated that the patient may manually adjust the cover 232 from the opened position to the closed position prior to activation of the motor 254.

Referring still to FIGS. 18, 20, and 21, once the sling 244 is in the fitted condition, the controller 82 is configured to begin the massage therapy protocol. The massage therapy protocol may be started automatically in response to the controller 82 detecting the pre-determined tension has been reached, or may be started in response to a user input. The sling 244 includes the bladders 246 extending parallel to one another and arranged along the sling 244. The bladders 246 are configured to extend around a circumference of the limb when the cover 232 is in the closed position. It is contemplated that the sling 244 may include a plurality of bladders 246, or alternatively, a single segmented bladder 246 where each segment is independently adjustable.

The bladders 246 are in fluid communication with the pump 68, which is stored within the therapeutic pad 230. The pump 68 may be connected to the bladders 246 by a manifold, tubing, or other connectors. The bladders 246 are adjustable between the deployed state and the non-deployed state. The deployed state may be an inflated condition of each bladder 246, and the non-deployed state may be a deflated condition of each bladder 246. The pump 68 generally directs fluid into the bladders 246 to adjust the bladders 246 from the non-deployed state to the deployed state. To adjust the bladders 246 to the non-deployed state, the pump 68 may actively remove the fluid from the bladders 246 (e.g., vacuum), or the fluid connection between the pump 68 and the bladders 246 may be disrupted. The therapeutic pad 230 may include storage for housing excess fluid for when the bladders 246 are in the non-deployed state. Moreover, the pump 68 may be in fluid communication with one or more valves for directing the fluid to selected bladders 246.

In the illustrated configuration, the bladders 246 are arranged in the bladder groups 246A-246C, collectively referred to as the bladders 246. The bladder group 246A is disposed around a distal portion of the limb (e.g., a wrist or an ankle). The bladder group 246A is generally adjusted to the deployed state first, applying pressure to the skin to push fluid away from the hand or foot, respectively, and up the limb. The bladder group 246B is subsequently adjusted to the deployed state to push the fluid further toward the trunk of the body. The bladder group 246A generally remains in the deployed state to prevent the fluid from moving away from the trunk of the body due to the pressure applied by the bladder group 246B. The bladder group 246C may then be adjusted to the deployed state. While the bladder group 246C is adjusted to the deployed state, the bladder group

246A may be adjusted to the non-deployed condition, removing pressure from the distal portion of the limb.

The bladders 246 may continue to be adjusted between the deployed state and the non-deployed state in a similar sequential manner. The sequential activation of the bladders 246 from the wrist to the shoulder or the ankle to the hip may drive fluid toward the central cavity of the body for processing by the circulatory system. It is contemplated that each bladder 246 in the bladder groups 246A-246C may be adjusted simultaneously or may be adjusted sequentially in a distal to a proximal direction. It is contemplated that additional or fewer bladders 246 or bladder groups may be included in the sling 244.

After the massage therapy treatment is completed, the rollers 252 loosen the sling 244 to return the sling 244 to the relaxed condition, allowing the patient to adjust the cover 232 to the opened position. The rollers 252 are configured to rotate in an opposing direction (e.g., opposite the directions f, g, respectively), which draws the second end 250 of the sling 244 in a direction opposite of the arrow 256 thereby loosening the sling 244. It is contemplated that the therapeutic pad 230 may include a guide member for facilitating the adjustment of the sling 244 within the therapeutic pad 230. The motor 254, and consequently the rollers 252, may be activated in response to a user input from the user-interface 90.

Referring still to FIGS. 18-21, the treatment assembly 12 with the therapeutic pad 230 and the cover 232 includes the pump 68, the controller 82, the power source 84, the rollers 252, and the motor 254, as well as any valves or tubing in fluid communication with the pump 68 and the bladders 246, all disposed in the interior of the therapeutic pad 230. This configuration may be advantageous for more convenient use by the patient with the operational components contained within the treatment assembly 12. Moreover, the therapeutic pad 230 and the cover 232 may provide a more passive treatment option for receiving massage treatment therapy. Accordingly, the patient may rest on the therapeutic pad 230 and allow the massage therapy treatment to be conducted for a longer period of time. The motor 254, as well as the massage treatment protocol, may be activated, deactivated, or adjusted through the user-interface 90.

The treatment assembly 12 may be configured to determine a circumference of the limb of the patient to provide metrics as to the status of the condition or the efficiency of the massage therapy protocol. The treatment assembly 12 includes a measuring system 260. The measuring system 260 generally includes a sensor 262 and at least one marker 264. The sensor 262 is generally disposed on the therapeutic pad 230 proximate mating surface 242 where the sling 244 extends into the therapeutic pad 230 to obtain data from the markers 264. The markers 264 are generally disposed along the sling 244. The markers 264 are disposed at intervals in a substantially linear arrangement between the first end 248 of the sling 244 and the second end 250. The markers 264 may be configured as barcodes, numbers, symbols, a ruler, etc. The sensor 262 is configured as an optical sensor configured to obtain data from the markers 264 within a field of view of the sensor 262.

When the sling 244 reaches the predetermined tension, the sensor 262 may obtain the data from the markers 264 within the field of view and communicate the obtained data to the controller 82. The controller 82 is configured to determine a circumference of the limb based on the data obtained by the sensor 262. For example, a length of the sling 244 from the first end 248 to the second end 250 may be stored by the controller 82, and the sensed information may be compared to the stored data to determine the circumference. Additionally or alternatively, the sensor 262 may scan the marker 264, which may be indicative of a specific measurement. In an additional example, the sensor 262 may be configured to send the change in the length of the sling 244 within the therapeutic pad 230 between the relaxed and fitted conditions. It is contemplated that the sensor 262 may be any type of sensor configured to obtain measurement data.

Figure 22:
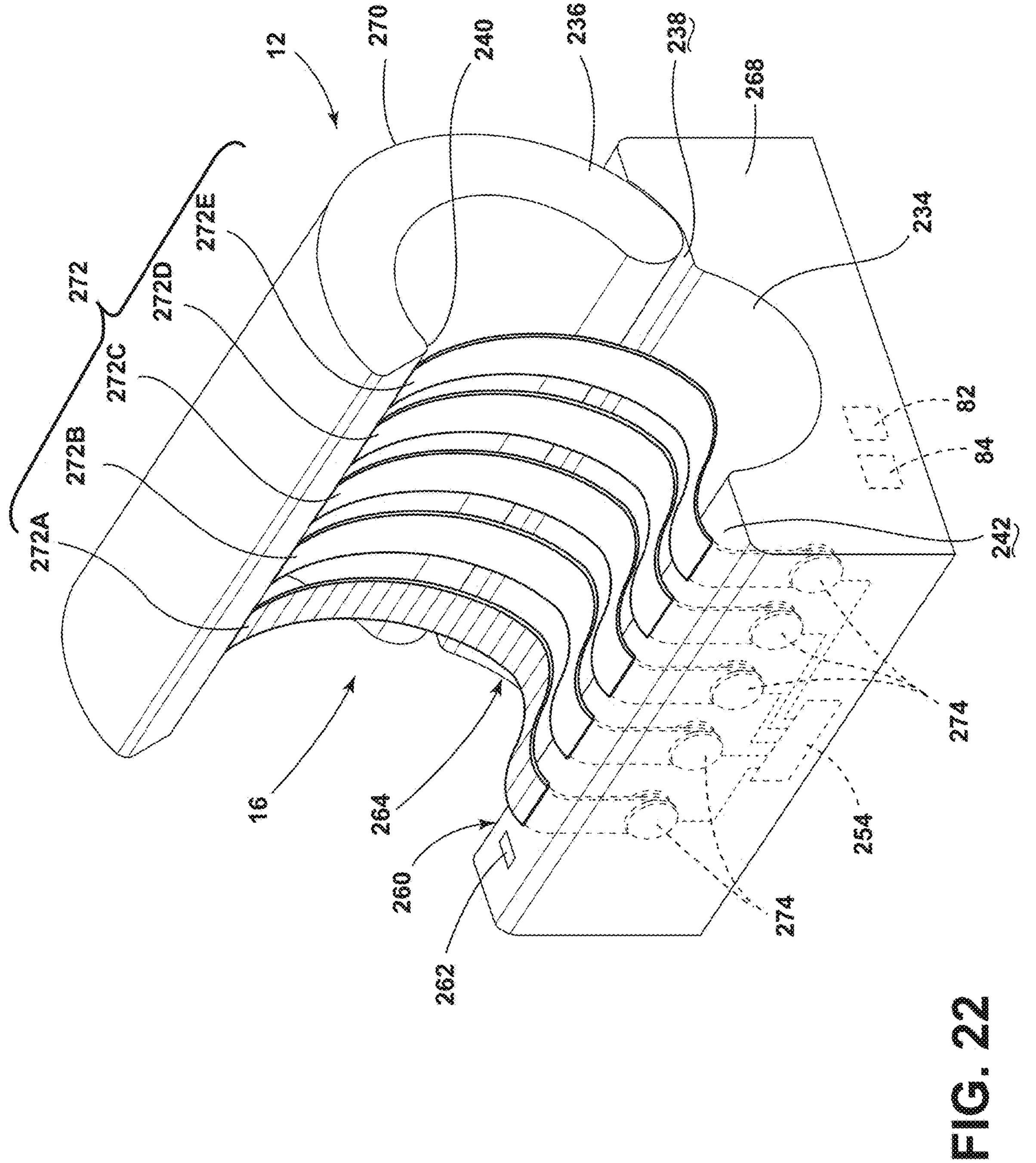
FIG. 22 is a schematic side perspective view of a treatment assembly that includes actuators, according to the present disclosure.

Referring to FIG. 22, an additional or alternative configuration of the treatment assembly 12 is illustrated, which includes a therapeutic pad 268 and a cover 270 adjustable between opened and closed positions. The treatment assembly 12 includes the actuators 16 configured as bands 272 spaced apart from one another and arranged in a parallel configuration along the treatment assembly 12. The bands 272 are configured to extend from the second edge 240 of the cover 270, around the limb, through the cavity 234, and operably couple to the mating surface 242 of the therapeutic pad 268. The bands 272 are configured to support the limb resting in the cavity 234 and completely wrap around the circumference of the limb when the cover 270 is in the closed position.

Each band 272 is operably coupled to a roller 274 or another adjusting device within the therapeutic pad 268. The motor 254 is operably coupled to each roller 274 to adjust the bands 272 from the relaxed condition, loosely fitting around the limb of the patient, to the fitted condition, snugly fitting around the limb. The pulling on the bands 272 by the rollers 274 may also operate to adjust the cover 270 from the opened position to the closed position. The rollers 274 are configured to pull each band 272 to a predetermined tension in the fitted condition. The bands 272 may be advantageous for providing a snug fit to different parts of the limb that may have a different circumference (e.g., an ankle compared to a thigh).

When the cover 270 is in the closed position and the bands 272 are in the fitted condition, the bands 272 are additionally adjusted between the deployed state and the non-deployed state. The deployed state may be a contracted condition of each band 272, and the non-deployed state may be a relaxed condition of each band 272. Each of the bands 272 may be independently adjusted to the deployed state to apply pressure to the skin of the patient.

In the illustrated configuration, band 272A is disposed adjacent to the distal portion of the limb, such as the wrist or the ankle, and is generally adjusted to the deployed state first to apply pressure to the affected area. Band 272B may be adjusted to the deployed state next to drive fluid further up the limb toward the trunk of the body. The band 272A remains in the deployed state as the band 272B is adjusted to the deployed state to prevent the fluid from moving back into the limb, away from the trunk of the body. Band 272C is disposed more proximal than bands 272A, 272B, and is adjusted to the deployed state next. As the band 272C is adjusted, the band 272A may be adjusted to the non-deployed condition to remove pressure from a more distal area of the limb. However, the band 272B generally remains in the deployed state during the adjustment of the band 272C to prevent the fluid from moving away from the trunk of the body. Bands 272D, 272E may be similarly sequentially adjusted to the deployed state. The sequential activation of the bands 272A-272E drives fluid toward the central cavity of the body for processing by the circulatory system. The bands 272 may be a flexible material, such as cloth or fabric, or may be a metal or metal alloy material. Additional or fewer bands 272 may be included in the treatment assembly 12.

Referring still to FIG. 22, the treatment assembly 12 may include the measuring system 260. The sensor 262 is disposed on the therapeutic pad 268 and the markers 264 are disposed on at least one of the bands 272. The measuring system 260 is configured to obtain the data relating to the circumference of the limb, as described herein. It is also contemplated that the treatment assembly 12 may include markers 264 on each band 272 and a sensor 262 associated with each band 272. In this way, different circumference measurements may be obtained at different portions of the limb.

Figure 23:
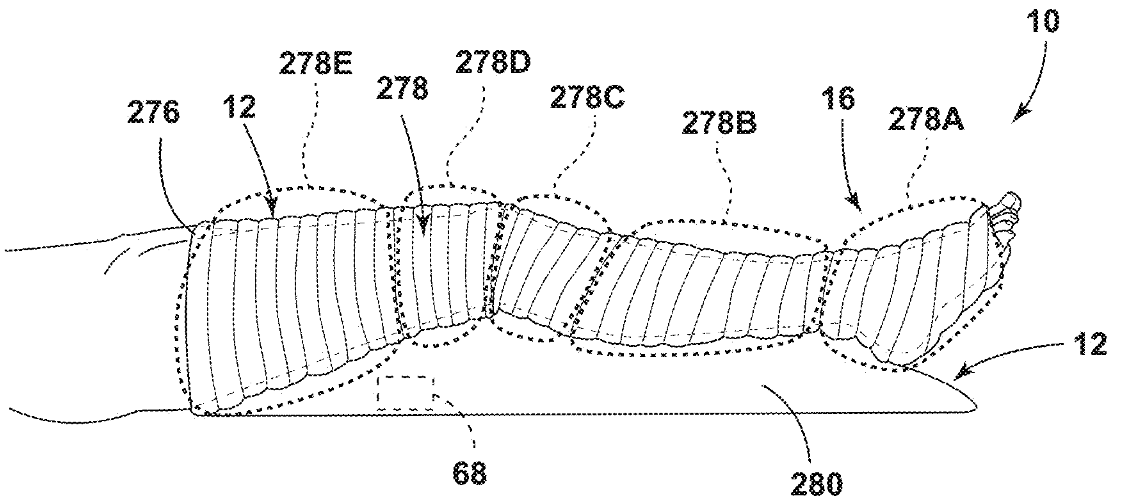
FIG. 23 is a side perspective view of a treatment assembly that includes a garment with bladders and an inflatable therapeutic pad in a deflated state, according to the present disclosure.
Figure 24:
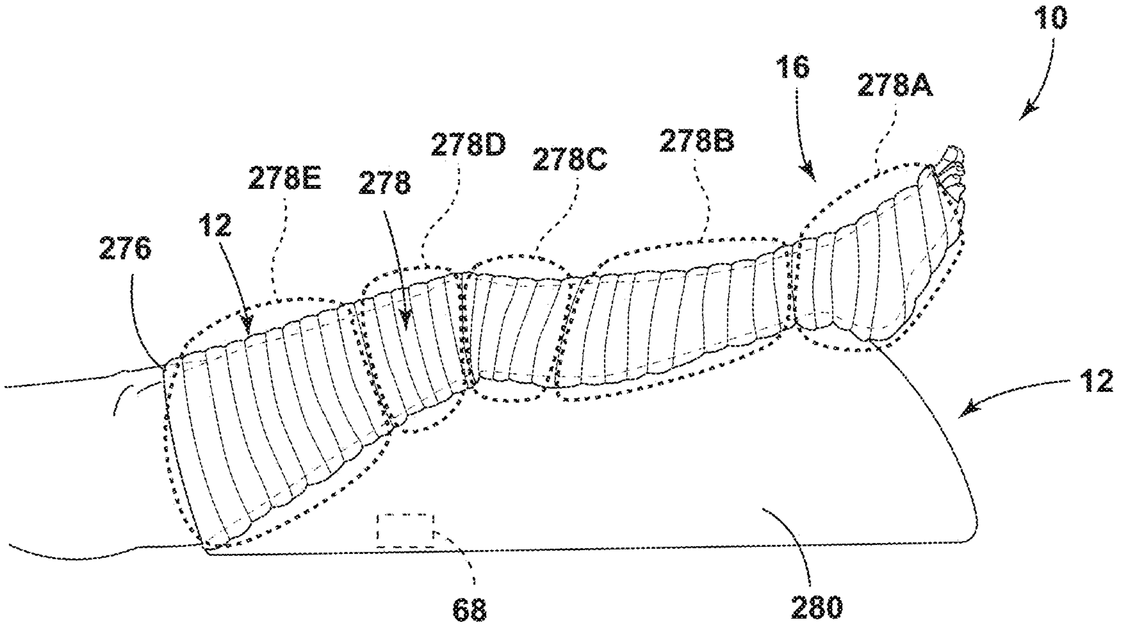
FIG. 24 is a side perspective view of the treatment assembly of FIG. 23 with the therapeutic pad in an inflated state, according to the present disclosure.

Referring to FIGS. 23 and 24, in an additional or alternative configuration of the health management system 10, the treatment assembly 12 includes the flexible member 14 configured as a garment 276 having actuators 16 configured as bladders 278, arranged in the illustrated bladder groups 278A-278E. The garment 276 is illustrated as a sock that extends from the foot of the patient to the hip of the patient. The bladders 278 each extend around a circumference of the affected area (e.g., the leg).

The bladders 278 are operable between the deployed state, which may be an inflated condition, and the non-deployed state, which may be a deflated state. The bladders 278 are configured to drive fluid away from the foot and toward the trunk of the body. Accordingly, the bladder group 278A disposed proximate to the foot is adjustable to the deployed state first. The bladder group 278B may then be adjusted to the deployed state to further push the fluid toward the trunk of the body. The bladder group 278A may remain in the deployed state to prevent fluid from returning to the ankle area in response to the pressure applied by the bladder group 278B.

The bladder group 278C may then be adjusted to the deployed state, further driving the fluid up the leg toward the hip. As the bladder group 278C is adjusted to the deployed state, the bladder group 278A may be adjusted to the non-deployed state, thereby removing pressure from the ankle area. The bladder groups 278D, 278E may be adjusted between the deployed state and the non-deployed state in a similar sequential manner as described herein. Each bladder 278 within the bladder groups 278A-278E may be adjusted simultaneously, or alternatively may be adjusted in a sequential pattern from a distal portion to a proximal portion. The bladders 278 are sequentially adjusted to apply pressure to drive fluid from the limb.

The treatment assembly 12 also includes a therapeutic pad 280. The therapeutic pad 280 is generally operable between a deflated state, as illustrated in FIG. 23, and an inflated state, as illustrated in FIG. 24. When in the inflated state, the therapeutic pad 280 assists the patient in lifting and elevating the limb. Conventional devices often require the patient to place a pillow under the affected limb to elevate the limb and assist in lymphatic draining. This activity can be difficult for patients with higher weights or have larger fluid-filled limbs, causing the patient to have difficulty with mobility. The treatment assembly 12 with the therapeutic pad 280 assists the patient in lifting his or her limb for treatment.

The treatment assembly 12 illustrated in FIGS. 23 and 24 provides a two-stage inflation process. The treatment assembly 12 includes the pump 68 in fluid communication with the bladders 278 and the therapeutic pad 280. When the patient applies the garment 276 to the affected area and activates the pump 68, a first stage of inflation causes the bladders 278 to adjust to the deployed state to provide pressure to the limb. A second stage of inflation, after a predetermined amount of time or in response to a user input, causes the therapeutic pad 280 to be adjusted to the inflated condition. Generally, the therapeutic pad 280 is wedge-shaped, elevating the limb while providing comfort to the patient. When the limb is elevated, gravitational assistance is provided to aid in drainage of built-up lymphatic fluid inside the limb.

Generally, in the first stage of inflation, the bladders 278 may all be adjusted to the deployed state to provide an even or consistently distributed pressure on the limb. The even pressure may be maintained as the limb is elevated by the inflation of the therapeutic pad 280 in the second stage of inflation. Once the therapeutic pad 280 is inflated, the bladders 278 may be adjusted to provide the sequential pressure to drive fluid in a proximal to distal direction to release the lymphatic fluid from the tissue. The therapeutic pad 280 allows the patient to elevate the affected limb for more efficient lymphatic draining without having to physically exert themselves.

Referring still to FIGS. 23 and 24, the garment 276 is generally coupled to the therapeutic pad 280 such that applying the garment 276 to the affected area positions the therapeutic pad 280 under the affected area. The pump 68 is in fluid communication with the bladders 278 and the therapeutic pad 280 via a manifold or tubing as well as valves to direct the fluid to a selected location. The pump 68 may direct fluid to the bladders 278 and the therapeutic pad 280. Additionally, the fluid communication between the bladders 278 and the therapeutic pad 280 may be disrupted to adjust each of the bladders 278 and the therapeutic pad 280 to the deflated state. Alternatively, the pump 68 may be configured to vacuum the fluid from the bladders 278 and/or the therapeutic pad 280. The treatment assembly 12 is illustrated on the leg of the patient, but may also be used on the arm or other affected area without departing from the teachings herein.

Figure 25:
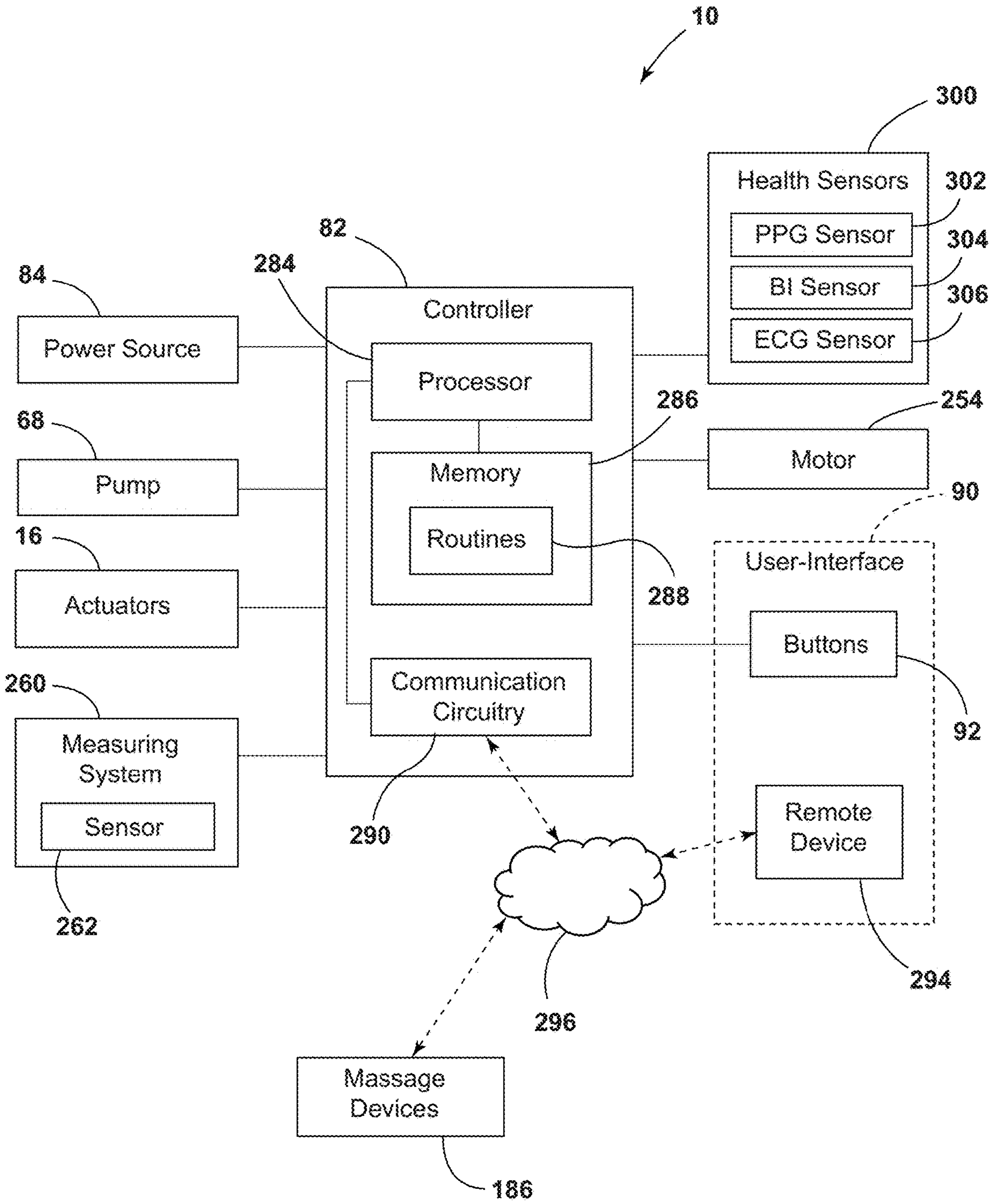
FIG. 25 is a block diagram of a health management system, according to the present disclosure.

Referring to FIG. 25, the health management system 10 includes the controller 82 that has a processor 284, a memory 286, and other control circuitry. Instructions or routines 288 are stored within the memory 286 and executable by the processor 284. The controller 82 includes one or more routines 288 for implementing the massage therapy protocols. The patient may select a specific massage therapy protocol through the user-interface 90. The controller 82 may then adjust the actuators 16 between the deployed state and the non-deployed state in accordance with the selected massage therapy protocol.

The controller 82 disclosed herein may include various types of control circuitry, digital or analog, and may include the processor 284, a microcontroller, an application specific circuit (ASIC), or other circuitry configured to perform the various input or output, control, analysis, or other functions described herein. The memory 286 described herein may be implemented in a variety of volatile and nonvolatile memory formats. The routines 288 include operating instructions to enable various methods and functions described herein.

For example, when the treatment assembly 12 includes the therapeutic wraps 38, 50, as illustrated in FIGS. 1-5, the controller 82 may send a signal to the pump 68 to insert or remove air from the channels 66. In examples where the treatment assembly 12 includes the sock 100, as illustrated in FIGS. 6-12, the controller 82 may be configured to send a current from the power source 84 to the voice coils 102 to adjust the voice coils 102 between the deployed state and the non-deployed state.

In examples where the treatment assembly 12 includes the therapeutic pad 180, as illustrated in FIGS. 13-16, the controller 82 may be configured to send a signal to the massage devices 186 through a wired or wireless communication mechanism, as will be discussed in further detail herein. The controller 82 may include communication circuitry 290 configured for bidirectional communication with the massage devices 186. The controller 82 may send a signal to the respective motorized assembly 198, 208 to adjust the massage devices 186 to the deployed state. Further, in examples where the treatment assembly 12 includes the therapeutic pad 218, as illustrated in FIG. 17, the controller 82 may be configured to activate the pump 68 to adjust the bladders 220 between the deployed state and the non-deployed state. Each configuration of the actuators 16 is configured to provide directional pressure to drive fluid toward the central core of the body.

In examples where the treatment assembly 12 includes the therapeutic pad 230, as illustrated in FIGS. 18-22, the controller 82 may be configured to send a signal to the pump 68 to add or remove fluid from the bladders 246. In examples where the treatment assembly 12 includes the therapeutic pad 268, as illustrated in FIG. 22, the controller 82 may be configured to send a signal to the rollers 274 to adjust the bands 272 to the deployed state. In examples where the treatment assembly 12 includes the therapeutic pad 280, as illustrated in FIGS. 23 and 24, the controller 82 may be configured to send a signal to the pump 68 to add or remove fluid from the bladders 278 and the therapeutic pad 280.

The controller 82 includes the communication circuitry 290 configured to communicate with the massage devices 186, as well as a remote device 294 included in the health management system 10. The controller 82 may communicate with the massage devices 186, the remote device 294, and/or remote servers (e.g., cloud servers, Internet-connected databases, computers, etc.) via a communication interface 296. The communication interface 296 may be a network having one or more various wired or wireless communication mechanisms, including any combination of wired (e.g., cable and fiber) or wireless communications and any network topology or topologies.

Exemplary communication networks include wireless communication networks, such as, for example, Bluetooth®, ZigBee®, Wi-Fi, IrDA, RFID, etc. The controller 82, the massage devices 186, and the remote device 294 may include circuitry configured for bidirectional wireless communication. Additional exemplary communication networks include local area networks (LAN) or wide area networks (WAN), including the Internet and other data communications services. It is contemplated that the controller 82, the massage devices 186, and the remote device 294 may communicate by any suitable technology for exchanging data.

The remote device 294 may be a remote handheld unit such as, for example, a phone, a tablet, a portable computer, a wearable device, etc. In a non-limiting example, the remote device 294 may be associated with a medical professional through a patient database system. Information relating to the massage therapy protocols may be communicated through the communication interface 296 to the patient database system. The medical professional may also assign massage therapy protocols or treatments through the communication interface 296.

Additionally or alternatively, the remote device 294 may belong to the patient, thereby allowing the patient to control the treatment of his or her condition. The patient controls the selection, activation, and modification of the massage therapy protocol through the remote device 294. Accordingly, the patient may control the actuators 16 through the remote device 294. The patient may also control the amount of pressure applied by the actuators 16 to the affected area.

Referring still to FIG. 25, the health management system 10 may include one or more health sensors 300 operably coupled to the treatment assembly 12. The health sensors 300 may be configured to obtain one or more metrics from the patient of the treatment assembly 12. The health sensors 300 may include a photoplethysmogram (PPG) sensor 302. The PPG sensor 302 may be used to determine pulse oximetry to measure oxygen saturation levels or $SpO_2$ levels of the blood. Generally, the PPG sensor 302 may include optical sensors, which include a first light source configured to emit visible light (e.g., having a wavelength in a range between about 380 nm and about 700 nm), which can be white light (e.g., having a wavelength in a range between about 400 nm and about 700 nm) or red light (e.g., having a wavelength in a range between about 620 nm and about 750 nm) and a second light source configured to emit infrared light (e.g., having a wavelength in a range between about 700 nm and about 1050 nm). The two light sources may be advantageous as red light may be primarily absorbed by deoxygenated blood and infrared light may be primarily absorbed by oxygenated blood.

The PPG sensor 302 may also include a detector, such as a photodiode, configured to receive the light. The PPG sensor 302 may be utilized to monitor peaks, often called amplitudes, of the pulse. The metrics and data detected by the PPG sensor 302 may be communicated to the controller 82 to determine the percentage of oxygen in the blood.

Additionally or alternatively, the health sensors 300 may include a bioimpedance (BI) sensor 304. Bioimpedance is a measure of how well the body impedes electrical current flow. Impedance is measured through the application of a small electric current. The change in the measured voltage compared to the input voltage may determine the composition of the measured area. Bioimpedance spectroscopy may be used to measure the impedance of biological tissues at a series of frequencies, which may measure the fluid within cells and fluid outside of cells in the measured area.

The BI sensor 304 may be configured as electrodes placed in contact with the skin of the patient, one of which emits a series of frequencies into the body. The frequencies penetrate certain aspects of the body, but not others. One of the electrodes may apply a small electric current from the power source 84 to be detected by the other electrode. Based on the penetration of the frequencies, the body composition of the patient may be determined. Using the data collected by the BI sensor 304, a fluid level of the affected area may be obtained. Accordingly, utilizing the BI sensor 304, the amount of fluid within the cells and outside of the cells in the affected area may be determined. The BI sensor 304 may be advantageous for determining an impedance of a specific limb, for example, the leg or the arm. The impedance measurement may be communicated to the controller 82.

The fluid levels inside the cell compared to outside the cell may be advantageous for monitoring the condition of the patient. The metrics relating to the fluid levels of the affected area may also be monitored to determine the effectiveness of a massage therapy protocol. Sensing the amount of fluid using bioimpedance allows for the health management system 10 to determine the amount of time needed to spend using the therapy device for treatment. This creates an individualized treatment plan as each patient can range in severity in the condition and when or how often the condition flares up.

In another example, the health sensors 300 may include an electrocardiogram (ECG) sensor 306. The ECG sensor 306 may be utilized to measure one or more of the six (6) lead ECG values depending on the configuration of the treatment assembly 12 or the health management system 10. The ECG sensor 306 may include the electrodes contactable by the user. The ECG sensor 306 may provide a passive differential voltage measuring system. The data obtained by the ECG sensor 306 may be communicated to the controller 82. It is contemplated that additional or alternative health sensors 300 that are configured to obtain one or more health metrics from the patient may be included in the health management system 10.

Referring still to FIG. 25, the data obtained by the health sensors 300 may be obtained for each affected area. The data may be utilized to determine various metrics, such as blood oxygen levels and fluid levels of the body. These metrics may be monitored to determine whether massage therapy is needed or the effectiveness of the massage therapy protocols. The health sensors 300 may be utilized to measure certain metrics for specific areas to monitor how each affected area, such as an arm or a leg, is responding to the massage therapy protocol.

The patient may monitor the metrics obtained by the health sensors 300 and the measuring system 260 through the remote device 294. This may allow the patient to view and monitor the health metrics and adjust the massage therapy protocol in response to the metrics. The metrics obtained by the health sensors 300 and the measuring system 260 may allow the patient to monitor the condition being treated. Additionally or alternatively, the medical professional or caregiver associated with the patient database system may utilize the metrics to assign or vary the massage therapy protocol.

Referring to FIGS. 1-25, the treatment assembly 12 provides directional pressure to the affected area to drive fluid toward the trunk of the body. The directional pressure may improve blood flow within the affected area. Additionally or alternatively, the directional pressure may drive the excess lymphatic fluid out of the limb and to the circulatory system to be processed. The directional pressure may result in directional activation of lymphatic vessels to assist in processing buildup of fluid in the body. The actuators 16 apply pressure from a distal portion of the body (e.g., a wrist or an ankle) to a proximal portion of the body (e.g., a shoulder or a hip), thereby activating the lymphatic vessels to transport fluid from the limb toward the trunk of the body. The directional pressure drives the fluid into the center core of the body to be processed by the circulatory system. The pressure may also assist in lymph node activation to assist in processing the lymphatic fluid. The health management system 10 may be advantageous for massaging lymph vessels and activating lymph nodes to process the buildup of fluid in the affected area.

Use of the present device may provide for a variety of advantages. For example, the flexible member 14 may be configured to be worn by the patient to provide the massage therapy treatment. Additionally, the actuators 16 may apply pressure to the affected area to drive fluid within the affected area in a specific direction, pushing the fluid out of the limb toward the trunk of the body to be processed by the circulatory system. Further, the health management system 10 that includes the therapeutic pads 180, 218 may provide a passive system that may be used for longer periods of time. The therapeutic pads 180, 218 may provide treatment to a patient overnight or over a period of hours. The therapeutic pads 230, 268, 280 may provide additional passive treatment options. Moreover, the measuring system 260 provides a process for obtaining data regarding the circumference of the limb within the treatment assembly 12. Also, the patient may use the remote device 294 to control the actuators 16, as well as to select or adjust the massage therapy protocol.

Additionally, the health management system 10 may include the health sensors 300 to obtain one or more health metrics from the patient. The patient may utilize the metrics to monitor the condition being treated, as well as the effectiveness of the treatment through the massage therapy protocol. The patient may also utilize the metrics obtained by the health sensors 300 to select a massage therapy protocol or a duration of the massage therapy treatment. Additional benefits or advantages may be realized and/or achieved.

The device disclosed herein is further summarized in the following paragraphs and is further characterized by combinations of any and all of the various aspects described therein.

According to an aspect of the present disclosure, a wrap for covering an affected area includes a flexible member configured to wrap around an affected area. Actuators are operably coupled to the flexible member. Each actuator is operable between a deployed state and a non-deployed state. A first coupling feature is disposed proximate a first edge on a first surface of the flexible member. A second coupling feature is disposed proximate a second edge on a second surface of the flexible member. The first coupling feature is configured to engage the second coupling feature when the flexible member is wrapped around the affected area and when the flexible member is slidably adjusted relative to the affected area. A retaining feature is coupled to at least one end of the flexible member and is configured to retain the flexible member in a selected position on the affected area.

According to another aspect, actuators are channels defined by a flexible member that extend along a longitudinal extent of the flexible member.

According to another aspect, a pump is in fluid communication with each channel via inlets defined by a flexible member. The pump is configured to direct fluid into each channel to provide pressure to an affected area.

According to another aspect, a flexible member forms a helix shape when a first coupling feature is engaged with a second coupling feature. The flexible member maintains the helix shape when the flexible member is slidably removed from the affected area and when the flexible member is slidably applied to an affected area.

According to another aspect, a retaining feature is an aperture defined in a distal end of a flexible member and is configured to receive a finger of a patient.

According to another aspect, a retaining feature includes a distal elongated flap having a first distal coupling feature that engages a second distal coupling feature around said affected area and a proximal elongated flap having a first proximal coupling feature that engages a second proximal coupling feature around said affected area.

According to another aspect of the present disclosure, a garment includes a flexible member configured to be worn on an affected area. A power source is operably coupled to the flexible member. An electromagnetic actuator is operably coupled to the power source. The electromagnetic actuator is operable between a deployed state and a non-deployed state in response to a voltage from the power source. The electromagnetic actuator applies pressure to the affected area when in the deployed state.

According to another aspect, an electromagnetic actuator is a voice coil.

According to another aspect, an engagement layer is operably coupled to an electromagnetic actuator. The electromagnetic actuator presses against the engagement layer when in a deployed state and, consequently, applies pressure to an affected area via the engagement layer.

According to another aspect, a slide assembly is coupled to the electromagnetic actuator. The slide assembly is operable between an extended condition when the electromagnetic actuator is in the deployed state and a retracted condition when the electromagnetic actuator is in the non-deployed state. An electromagnetic actuator is configured to apply force to the slide assembly when in a deployed state and, consequently, adjust the slide assembly to the extended condition to apply directional pressure to an affected area.

According to another aspect, a guide member is operably coupled to an electromagnetic actuator and includes flexible projections. The flexible projections are configured to apply directional pressure to an affected area when the electromagnetic actuator is in the deployed state.

According to another aspect of the present disclosure, a health management system includes a therapeutic pad for supporting an affected area of a patient. Actuators are operably coupled to the therapeutic pad. A controller is communicatively coupled to the actuators. The controller is configured to adjust the actuators between a deployed state and a non-deployed state. The actuators are configured to apply pressure to the affected area supported by the therapeutic pad when the actuators are in the deployed state.

According to another aspect, a sensor is operably coupled to a therapeutic pad to obtain a health metric from a user. The sensor is at least one of a photoplethysmogram sensor, an electrocardiogram sensor, and a bioimpedance sensor.

According to another aspect, a controller is configured to adjust actuators between a deployed state and a non-deployed state in response to a massage therapy protocol. The message therapy protocol extends over a period of hours.

According to another aspect, the actuators are bladders in fluid communication with a pump to be adjusted between a deployed state and a non-deployed state. The bladders are disposed in a therapeutic pad.

According to another aspect, actuators are remote massage devices selectively coupled to a surface of a therapeutic pad. The remote massage devices include at least one of elongated protrusions configured to rotate relative to a support structure and massage features configured to translate and rotate relative to the support structure.

According to another aspect, a cover is operably coupled to a therapeutic pad. The cover is adjustable between an opened position and a closed position relative to an elongated cavity defined by the therapeutic pad. A sling extends between the cover and the therapeutic pad, and the sling includes the actuators. Rollers are operably coupled to the therapeutic pad and the sling, and the rollers are configured to adjust the sling between a relaxed condition and a fitted condition.

According to another aspect, a flexible member is configured to be worn over an affected area. The flexible member is coupled to a therapeutic pad. Actuators are bladders disposed within the flexible member.

According to another aspect, a pump is in fluid communication with bladders and a therapeutic pad. The therapeutic pad is operable between a deflated state and an inflated state to selectively elevate the affected area.

According to another aspect, a controller is configured to adjust bladders to a deployed state to apply pressure to an affected area, adjust a therapeutic pad to an inflated state to elevate the affected area, and selectively and sequentially adjust the bladders between the deployed state and a non-deployed state to provide directional pressure along the affected area.

A means for treating that includes a means for wearing on an affected area. Means for applying pressure are operably coupled to the means for wearing. The means for applying pressure are operable between a deployed state and a non-deployed state. A first means for coupling is disposed proximate a first edge on a first surface of the means for wearing. A second means for coupling is disposed proximate a second edge on a second surface of the means for wearing. The first means for coupling is configured to engage the second means for coupling when the means for wearing in on the affected area and when the means for wearing is slidably adjusted relative to the affected area. A means for retaining is coupled to at least one end of the means for wearing and configured to retain the means for wearing in a selected position on the affected area.

Related applications, for example those listed herein, are fully incorporated by reference. Descriptions within the related applications are intended to contribute to the description of the information disclosed herein as may be relied upon by a person of ordinary skill in the art. Any changes between any of the related applications and the present disclosure are not intended to limit the description of the information disclosed herein, including the claims. Accordingly, the present application includes the description of the information disclosed herein as well as the description of the information in any or all of the related applications.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A health management system, comprising:
- a therapeutic pad for supporting an affected area of a patient;
- actuators operably coupled to the therapeutic pad;
- a cover operably coupled to the therapeutic pad, wherein the cover is adjustable between an opened position and a closed position relative to an elongated cavity defined by the therapeutic pad;
- a sling extending between the cover and the therapeutic pad, wherein the sling includes the actuators;
- rollers operably coupled to the therapeutic pad and operably coupled to the sling, wherein the rollers are configured to adjust the sling between a relaxed condition and a fitted condition; and
- a controller communicatively coupled to the actuators, wherein the controller is configured to adjust the actuators between a deployed state and a non-deployed state, and wherein the actuators are configured to apply pressure to the affected area supported by the therapeutic pad when the actuators are in the deployed state.

2. The health management system of claim 1, further comprising:
- a sensor operably coupled to the therapeutic pad to obtain a health metric from a user, wherein the sensor is at least one of a photoplethysmogram sensor, an electrocardiogram sensor, and a bioimpedance sensor.

3. The health management system of claim 1, wherein the controller is configured to adjust the actuators between the deployed state and the non-deployed state in response to a massage therapy protocol, and wherein the massage therapy protocol extends over a period of hours.

4. The health management system of claim 1, further comprising:
- a pump coupled to the therapeutic pad, wherein the actuators are bladders in fluid communication with the pump to be adjusted between the deployed state and the non-deployed state, and wherein the bladders are disposed in the therapeutic pad.

5. The health management system of claim 1, further comprising:
- a pump coupled to the therapeutic pad, wherein the actuators are bladders in fluid communication with the pump to be adjusted between the deployed state and the non-deployed state, and wherein the bladders are disposed in the sling.

6. The health management system of claim 1, further comprising:
- a measuring system including:
  - a sensor coupled with the therapeutic pad proximate to a mating surface where the sling engages the therapeutic pad; and
  - markers disposed on the sling, wherein the sensor is configured to sense at least one of the markers within a field of view of the sensor and communicate sensed data to the controller, and wherein the controller is configured to determine a circumference of the affected area using the sensed data.

7. The health management system of claim 1, further comprising:
- therapy rollers operably coupled to the therapeutic pad, wherein the actuators are bands with each band operably coupled to a respective one of the therapy rollers for adjusting the bands between the deployed state and the non-deployed state.

8. A health management system, comprising:
- a therapeutic pad for supporting an affected area of a patient, wherein the therapeutic pad defines at least one elongated cavity for receiving the affected area;
- coupling features extending over a cavity surface of the at least one elongated cavity of the therapeutic pad;
- remote massage devices removably coupled to the cavity surface of the therapeutic pad, wherein each remote massage device includes:
  - a fastening assembly configured to couple the remote massage device to the therapeutic pad at selected locations via engagement with at least one of the coupling features;
  - a support structure;
  - at least one massage feature operably coupled with the support structure; and
  - a motorized assembly operably coupled with the at least one massage feature, wherein the motorized assembly is configured to rotate the at least one massage feature relative to the support structure; and
- a controller communicatively coupled to the remote massage devices, wherein the controller is configured to adjust the remote massage devices between a deployed state and a non-deployed state, and wherein the remote massage devices are configured to apply pressure to the affected area supported by the therapeutic pad when the at least one massage feature is in the deployed state.

9. The health management system of claim 8, wherein the at least one massage feature includes elongated protrusions configured to rotate relative to the support structure, respectively, and wherein the elongated protrusions are configured to rotate about parallel rotational axes.

10. The health management system of claim 8, wherein the at least one massage feature is configured to translate along a longitudinal extent of the support structure.

11. The health management system of claim 10, wherein the at least one massage feature includes protrusions.

12. The health management system of claim 10, wherein the at least one massage feature is configured to rotate about an axis that is perpendicular to the longitudinal extent of the support structure.

13. The health management system of claim 8, wherein the at least one elongated cavity includes a first elongated cavity and a second elongated cavity, and wherein the coupling features are arranged over the cavity surface in each of the first and second elongated cavities.

* * * * *